(12) United States Patent
Hirata et al.

(10) Patent No.: US 12,038,644 B2
(45) Date of Patent: Jul. 16, 2024

(54) LIGHT SOURCE APPARATUS AND INFORMATION DISPLAY SYSTEM USING THE SAME

(71) Applicant: Maxell, Ltd., Kyoto (JP)

(72) Inventors: Koji Hirata, Kyoto (JP); Toshinori Sugiyama, Kyoto (JP); Koji Fujita, Kyoto (JP); Eiji Takagi, Kyoto (JP)

(73) Assignee: MAXELL, LTD., Kyoto (JP)

( * ) Notice: Subject to any disclaimer, the term of this patent is extended or adjusted under 35 U.S.C. 154(b) by 133 days.

(21) Appl. No.: 17/641,102

(22) PCT Filed: Jun. 3, 2020

(86) PCT No.: PCT/JP2020/021995
§ 371 (c)(1),
(2) Date: Mar. 8, 2022

(87) PCT Pub. No.: WO2021/049107
PCT Pub. Date: Mar. 18, 2021

(65) Prior Publication Data
US 2022/0291545 A1     Sep. 15, 2022

(30) Foreign Application Priority Data
Sep. 12, 2019 (JP) ................. 2019-165841

(51) Int. Cl.
*G02F 1/1335* (2006.01)
*G02F 1/1334* (2006.01)
*G02F 1/13363* (2006.01)

(52) U.S. Cl.
CPC ...... *G02F 1/133536* (2013.01); *G02F 1/1334* (2013.01); *G02F 1/133504* (2013.01); *G02F 1/133638* (2021.01)

(58) Field of Classification Search
CPC ............. G02F 1/133536; G02F 1/1334; G02F 1/133504; G02F 1/133638
(Continued)

(56) References Cited

U.S. PATENT DOCUMENTS

2013/0286678 A1    10/2013  Sugiyama et al.
2015/0248033 A1*    9/2015  Zhu .................. G02B 6/0053
                                                    349/57
(Continued)

FOREIGN PATENT DOCUMENTS

JP    2015-210844 A    11/2015
JP    6133522 B1        5/2017
(Continued)

OTHER PUBLICATIONS

International Search Report and Written Opinion dated Jul. 7, 2020, received for PCT Application PCT/JP2020/021995, Filed on Jun. 3, 2020, 9 pages including English Translation.

*Primary Examiner* — Charles S Chang
(74) *Attorney, Agent, or Firm* — XSENSUS LLP

(57) ABSTRACT

A light source apparatus configured to supply light in a specific polarization direction to an image display apparatus includes a point or surface light source, an optical unit configured to reduce a divergence angle of light from the light source, and a light guide body having a reflection surface configured to reflect the light from the light source and propagate it to the image display apparatus, the reflection surface of the light guide body is arranged so as to face the image display apparatus, and a reflection type polarization plate and a retardation plate are arranged in order from a side closer to the image display apparatus between the image display apparatus and the reflection surface.

24 Claims, 20 Drawing Sheets

(58) Field of Classification Search
USPC .............................................. 349/61–68, 96
See application file for complete search history.

(56) References Cited

U.S. PATENT DOCUMENTS

| | | |
|---|---|---|
| 2018/0180982 A1 | 6/2018 | Yamaki et al. |
| 2018/0348411 A1 | 12/2018 | Yamaki et al. |
| 2020/0124886 A1* | 4/2020 | Song .................... G02B 6/0068 |
| 2020/0371389 A1* | 11/2020 | Geng ................... G02B 6/0028 |

FOREIGN PATENT DOCUMENTS

| | | |
|---|---|---|
| JP | 6199530 B1 | 9/2017 |
| WO | 2013/080488 A1 | 6/2013 |

\* cited by examiner

FIG. 9
(a)
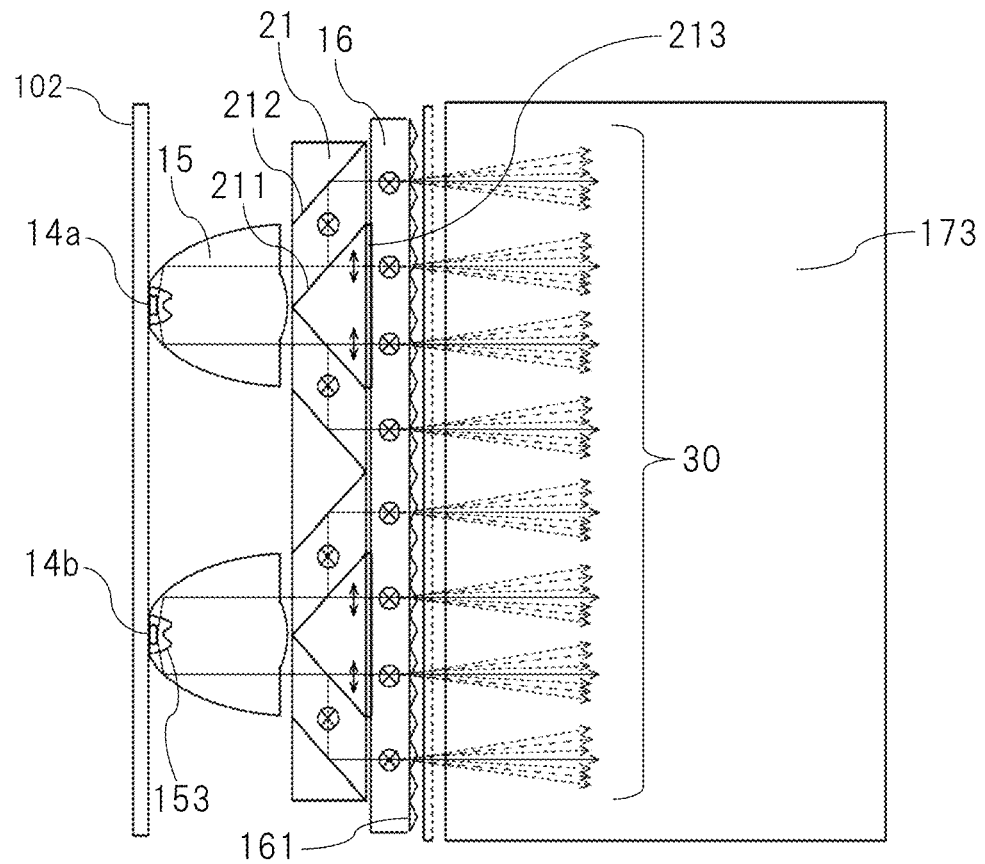
(b)
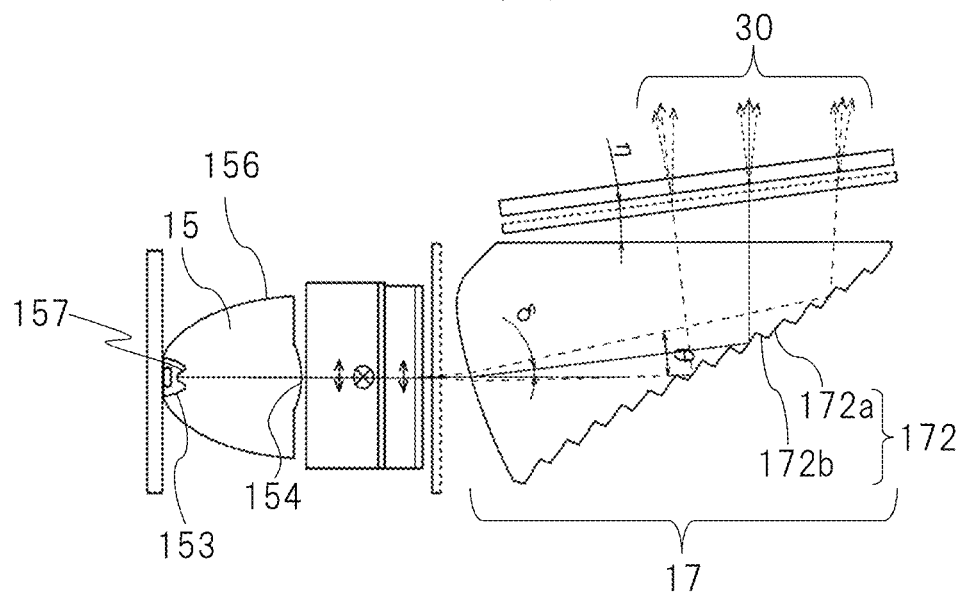

FIG. 10
(a)
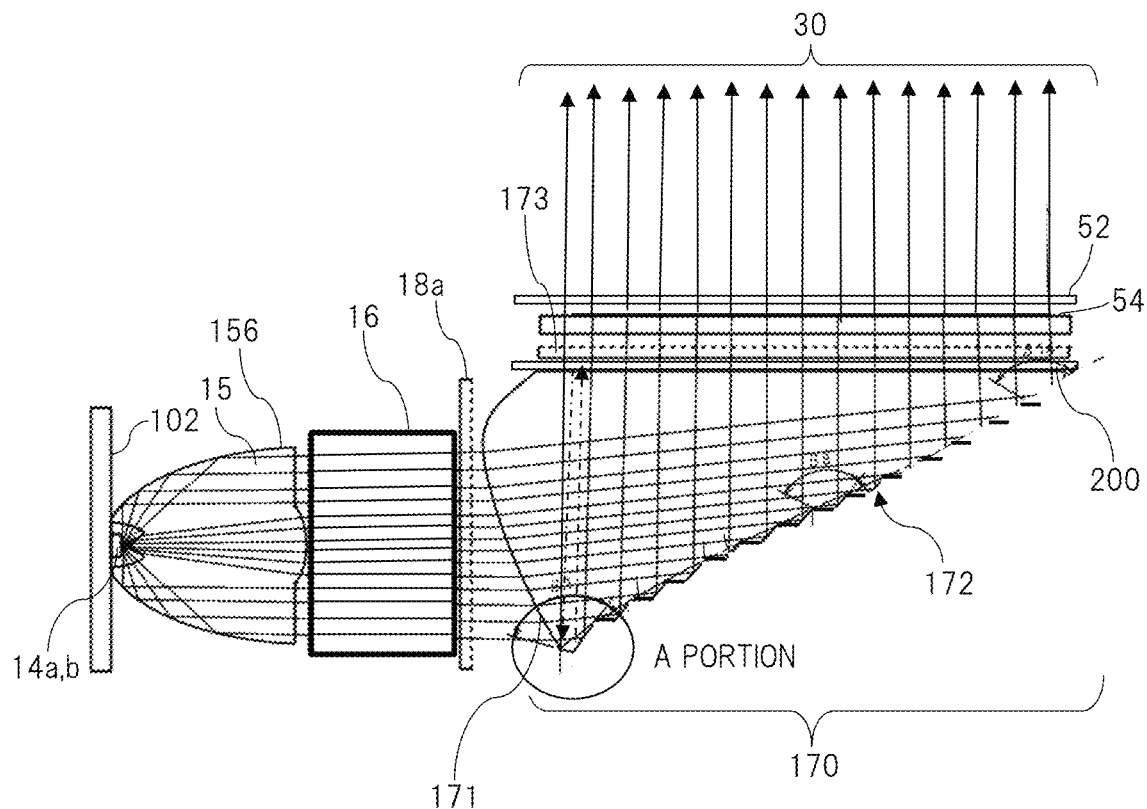
(b)
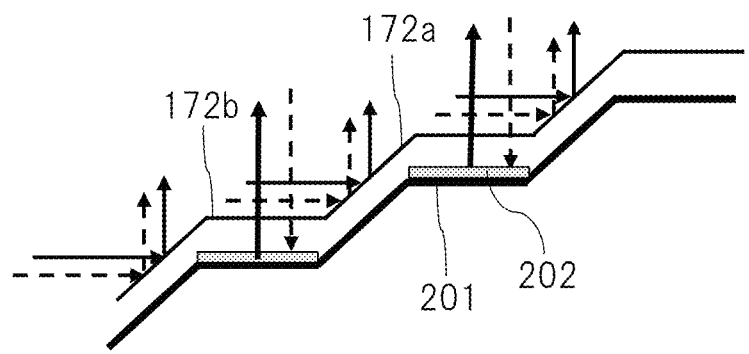

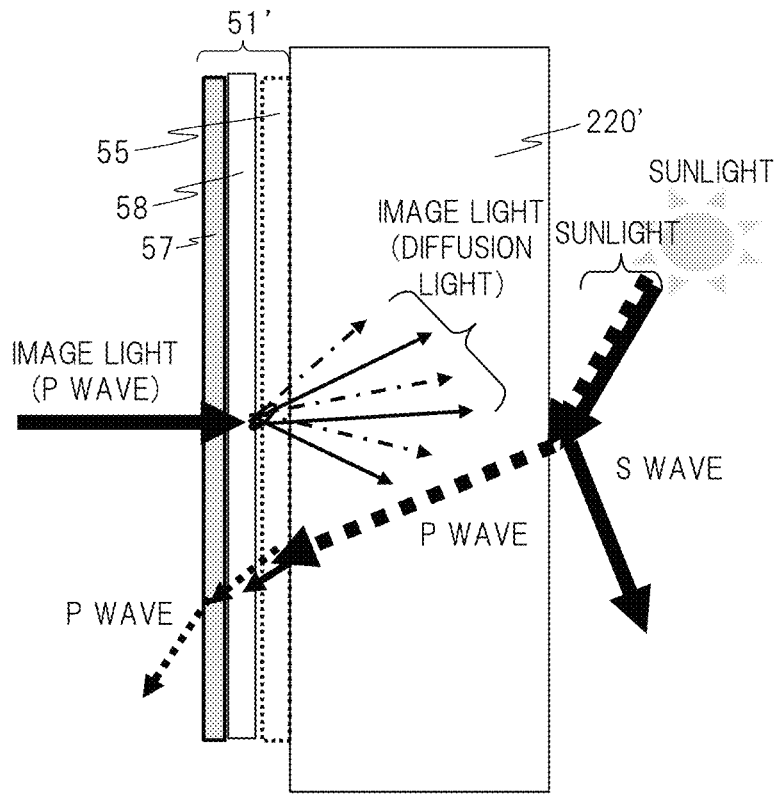
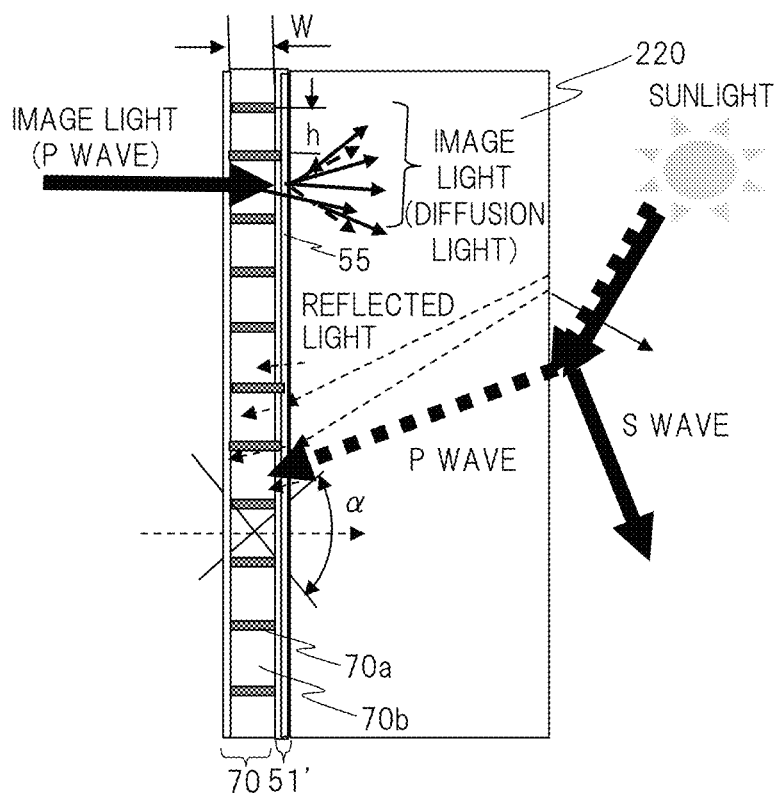

FIG. 19
(a)
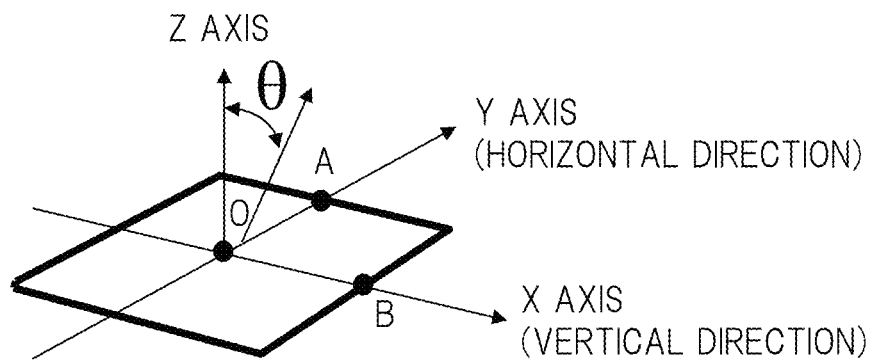
(b)
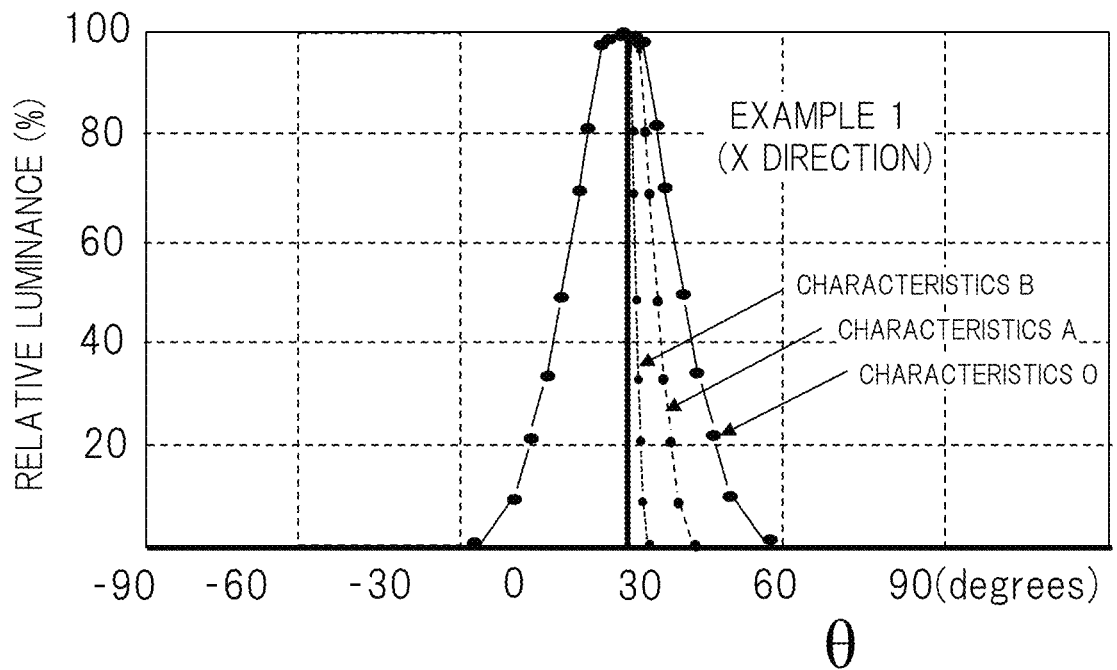

REFLECTANCE OF GLASS TO P-POLARIZED LIGHT AND S-POLARIZED LIGHT

LIGHT SOURCE APPARATUS AND INFORMATION DISPLAY SYSTEM USING THE SAME

CROSS-REFERENCE TO RELATED APPLICATIONS

The present application is based on PCT filing PCT/JP2020/021995, filed Jun. 3, 2020, which claims priority to JP 2019-165841, filed Sep. 12, 2019, the entire contents of each are incorporated herein by reference.

TECHNICAL FIELD

The present invention relates to a light source apparatus and an information display system using the same.

BACKGROUND ART

As an information display system, a system configured to display an image by controlling diffusion characteristics of image light by use of a transmission type screen has already been known other than the information display system configured to display an image directly to an outside. For example, according to Patent Document 1 and Patent Document 2 below, a transmission or reflection type screen provided with a light diffusion layer containing a binder and fine particles has already been known.

RELATED ART DOCUMENTS

Patent Documents

Patent Document 1: Japanese Patent No. 6133522
Patent Document 2: Japanese Patent No. 6199530

SUMMARY OF THE INVENTION

Problems to be Solved by the Invention

However, in the conventional projection information display system or apparatus mentioned above, consideration is not given to the improvement of the light utilization efficiency by efficient (effective) delivery of image light to an observer outside a vehicle or outside a room and the resulting reduction in power consumption of the apparatus including a light source. Therefore, the present invention provides a technology capable of suitably displaying an image to the outside of a space.

Means for Solving the Problems

In order to solve the problem described above, for example, a configuration described in claims is adopted. This application includes a plurality of means for solving the problem described above, and an example thereof is a light source apparatus configured to supply light in a specific polarization direction to an image display apparatus. More specifically, the light source apparatus includes: a point or surface light source; an optical element configured to reduce a divergence angle of light from the light source; a light guide body configured to propagate the light from the light source to the image display apparatus; and a reflection type polarization plate arranged between the light guide body and the image display apparatus, wherein the light guide body is provided with a reflection surface configured to reflect the light from the light source toward the reflection type polarization plate, wherein light in a specific polarization direction reflected by the reflection type polarization plate is reflected by a reflection plate and is caused to pass a retardation plate twice, thereby performing polarization conversion, and the light is propagated to the image display apparatus by passing the reflection type polarization plate, and wherein a part or all of a divergence angle of a light flux incident on the image display apparatus from the light source is controlled by a shape and roughness of a reflection surface provided on the light source apparatus.

Effect of the Invention

According to the present invention, it is possible to suitably display an image to the outside of a space. The problems, configurations, and effects other than those described above will become apparent by the description of the embodiments below.

BRIEF DESCRIPTIONS OF THE DRAWINGS

FIG. 9 is a cross-sectional view showing an example of a specific configuration of the light source apparatus;

FIG. 10 is a cross-sectional view showing an example of a specific configuration of the light source apparatus;

FIG. 15 is an explanatory diagram of a unidirectional transparent sheet (transmission type);

FIG. 16 is an explanatory diagram of a unidirectional transparent sheet (transmission type);

FIG. 19 is a diagram showing image light diffusion characteristics of the image display apparatus;

DETAILED DESCRIPTION OF PREFERRED EMBODIMENTS

Figure 1:
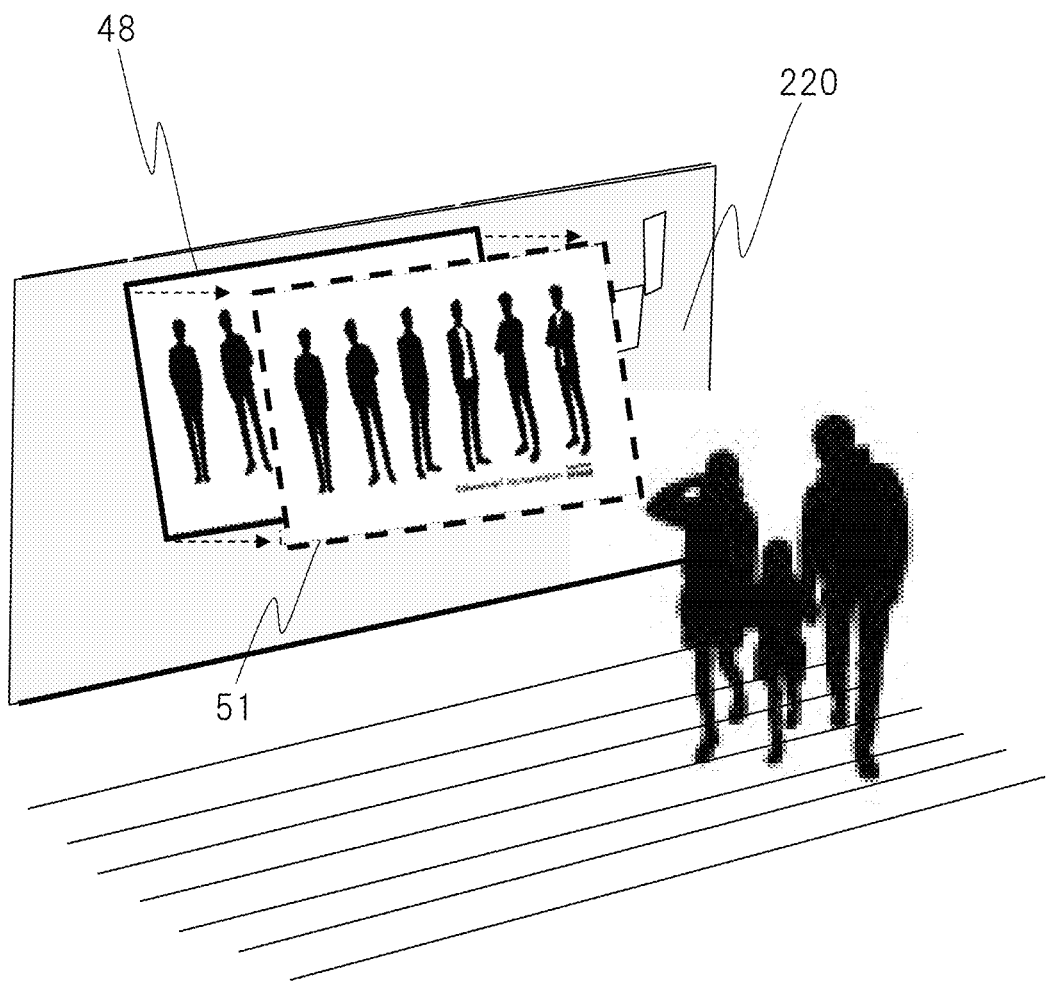
FIG. 1 is a diagram showing an example of an overall configuration of an information display system according to an embodiment of the present invention.

The following embodiments relate to an information display system capable of displaying an image by image light from a large-area image light source to outside of a store (space) by transmitting through a transparent member that partitions the space such as a show window glass. Also, the following embodiments relate to a vehicle information display system configured to project an image to outside through a windshield, a rear glass, and a side glass of an automobile or a train (hereinafter, collectively referred to as "vehicle") by using the information display system.

According to the following embodiments, it is possible to provide a novel information display system excellent in usability capable of displaying high-resolution image information even on a glass surface of a show window or a rear glass, a windshield, or a side glass of a vehicle and capable of significantly reducing power consumption of the apparatus including a light source by making a divergence angle of the emitted image light small, that is, an acute angle and further aligning it with a specific polarized wave so as to efficiently deliver the image light to the observer and improve the light utilization efficiency. Further, it is also possible to provide a vehicle information display system capable of performing the so-called unidirectional display that can be recognized outside a vehicle through a shield glass including a windshield, a rear glass, and a side glass of the vehicle.

As a conventional and general vehicle information display system configured to display image information to the outside of a vehicle, a system in which LED chips are arranged in matrix and are lit in accordance with image information has been known. In such a system, (1) large power is required in order to obtain desired brightness because the LED chip has a wide diffusion angle. Also, (2) LED chips to obtain the desired brightness each have large dimensions and the high resolution cannot be obtained in the information display system having the dimensions capable of being mounted on the vehicle. Further, (3) the color display of the image becomes difficult if attempting to prevent the increase in the size of the apparatus.

Meanwhile, when the image information is displayed to the outside of the vehicle by the information display apparatus using the conventional liquid crystal panel capable of high-resolution color display, the brightness (luminance) of the image becomes insufficient, and the problem that the display content cannot be recognized under the bright sun or the like may occur. If the large-output LED light source configured to generate a large amount of light flux is used for the backlight in order to solve the problem, the power consumption and the heat generation of the LED increase and the size of the system further increases due to this measure, and it is thus difficult to use it as the vehicle information display system.

Hereinafter, the embodiments of the present invention will be described in detail with reference to drawings. Note that the present invention is not limited to the described embodiments and various modifications and alterations by a person having ordinary skill in the art are possible within the range of technical idea disclosed in this specification. Also, the components having the same function are denoted by the same reference characters throughout the drawings for describing the present invention, and the repetitive descriptions thereof will be omitted in some cases.

<Information Display System>

FIG. 1 shows an overall configuration of an information display system according to the present embodiment. For example, in a store or the like, a space is partitioned by a show window (also referred to as "window glass") 220 which is a translucent member such as glass, and with the information display system according to the present embodiment, it is possible to unidirectionally display an image to outside of the store (space) through the transparent member. In FIG. 1, the inside of the show window 220 (inside the store) is shown as a far side in the depth direction, and the outside thereof (for example, the sidewalk) is shown as a near side.

More specifically, as shown in FIG. 1, an image display apparatus 48 (described later in detail) provided with a light source and configured to generate and project image light to be displayed is arranged in front of or obliquely above the show window 220 which is a transparent member such as glass, and the image light generated by the image display apparatus 48 is unidirectionally displayed to outside by the function of a light direction changing panel 54 and a transparent sheet (film) 51 attached to the show window 220 (described later in detail). Accordingly, it is possible to display various kinds of information to outside by using the show window 220, and it is possible to remarkably improve the utilization efficiency of the show window.

Figure 4:
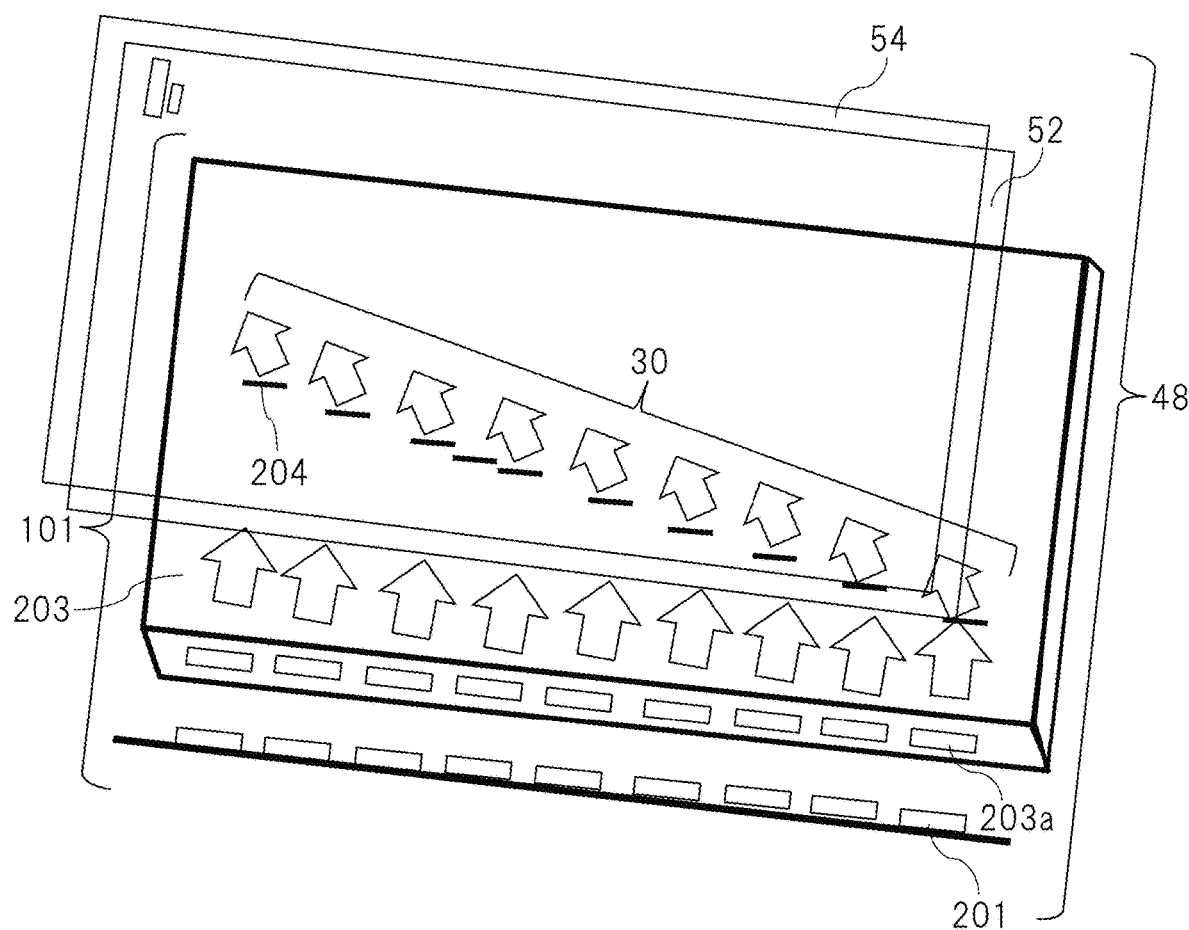
FIG. 4 is a diagram showing an example of a specific configuration of an information display apparatus.

Next, FIG. 4 shows a more specific configuration of the information display system, and an image display element 52 constituting the image display apparatus 48 is composed of a relatively large-sized liquid crystal display panel with a screen size of more than 15 inches. Further, in order to perform correction at a level of causing no problem in practical use by distortion correction, the resolution of the panel is preferably 1280×720 dots or more, and the resolution of the panel is desirably 1980×1080 dots or more in order to display the image information as a static image or a moving image in addition to the character information to outside.

Also, the image display apparatus 48 further includes a light source apparatus 101 constituting a light source thereof together with the image display element 52 (liquid crystal display panel), and the light source apparatus 101 is shown in a developed perspective view together with the liquid crystal display panel in FIG. 4.

As indicated by arrows 30 in FIG. 4, the liquid crystal display panel (image display element 52) obtains an illumination light flux having characteristics similar to laser light with acute-angled diffusion characteristics, that is, strong directivity (straightness) and polarization plane aligned in one direction, by the light from the light source apparatus 101 which is a backlight apparatus, and emits the image light modulated in accordance with an input image signal to the transparent sheet 51 provided on a surface of the window glass 220. Also, in FIG. 4, the information display system is configured to include the liquid crystal display panel 52 constituting the image display apparatus 48, the light direction changing panel 54 configured to control the directional characteristics of the light flux emitted from the light source apparatus 101, and a narrow-angle diffusion plate (not shown) as needed. Namely, polarization plates are provided on both surfaces of the liquid crystal display panel 52, and the image light of a specific polarized wave is emitted with the light intensity modulated by the image signal (see arrows 30 in FIG. 4). Consequently, a desired image is projected as light of a specific polarized wave having high directivity (straightness) toward the window glass 220 via the light direction changing panel 54, and it transmits through the transparent sheet 51 provided on the surface thereof so as to be directed to the eyes of the observer outside the store (space). Note that a protective cover 50 may be provided on the surface of the above-mentioned light direction changing panel 54.

In the present embodiment, in order to significantly reduce the power consumption by improving the utilization efficiency of the light flux 30 emitted from the light source apparatus 101, in the image display apparatus 48 including the light source apparatus 101 and the liquid crystal display panel 52, high directivity is given by optical components such as a lenticular lens and a transparent panel to the luminance of the image light which is the light from the light source apparatus 101 (see arrows 30 in FIG. 4) and is transmitted through or diffused by the transparent sheet 51 provided on the surface of the window glass 20. According to this, the image light from the image display apparatus 48 efficiently reaches an observer outside the show window 220 (for example, on a sidewalk) with high directivity (straightness) like a laser beam, and as a result, a high-quality image can be displayed with high resolution and the power consumption by the image display apparatus 48 including an LED element 201 of the light source apparatus 101 can be remarkably reduced.

First Example of Image Display Apparatus

Figure 5:
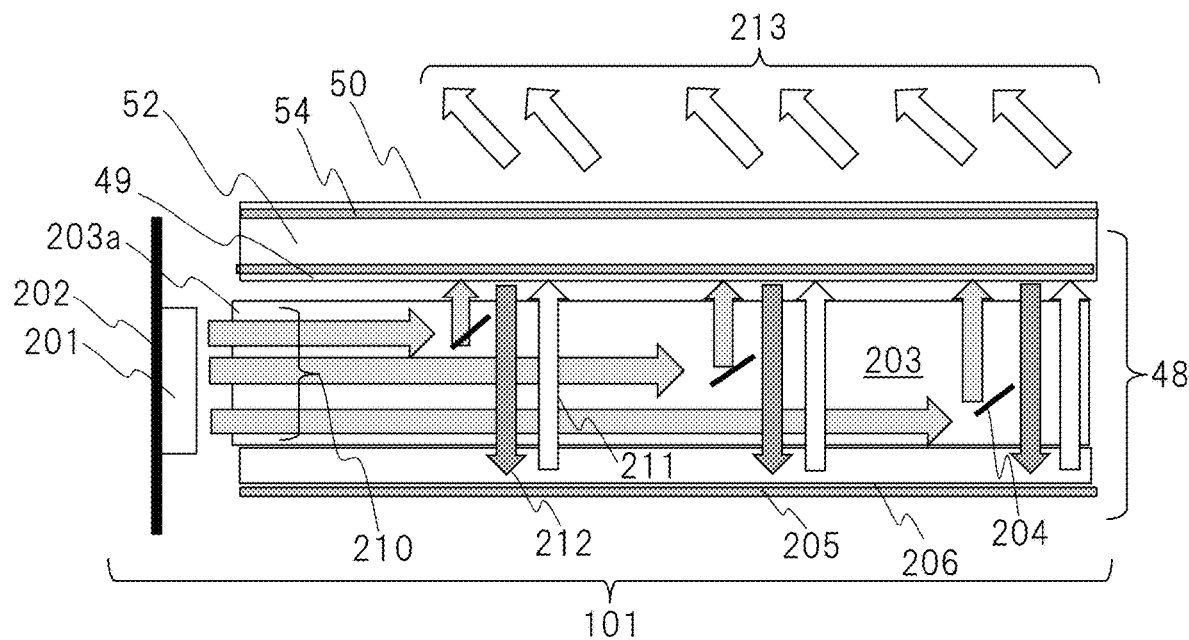
FIG. 5 is a cross-sectional view showing an example of a specific configuration of a light source apparatus.

FIG. 5 shows an example of a specific configuration of the image display apparatus 48. In FIG. 5, the liquid crystal display panel 52 and the light direction changing panel 54 are arranged on the light source apparatus 101 in FIG. 4. The light source apparatus 101 is formed of plastic or the like on the case shown in FIG. 4, and is configured such that the LED element 201 and a light guide body 203 are housed therein. On an end surface of the light guide body 203, in order to convert the divergent light from each of the LED elements 201 into substantially parallel light flux as shown in FIG. 4, a lens shape whose cross-sectional area gradually increases toward a light receiving portion and which totally reflects the light plural times to gradually reduce a divergence angle when propagating inside is provided. On an upper surface thereof, the liquid crystal display panel 52 constituting the image display apparatus 48 is attached. Further, on one side surface (left end surface in this example) of the case of the light source apparatus 101, the LED (Light Emitting Diode) element 201 which is a semiconductor light source and an LED board 202 on which the control circuit thereof is mounted are attached, and a heat sink which is a member for cooling the heat generated by the LED element and the control circuit is attached to an outer surface of the LED board 202 in some cases.

Also, on a frame (not shown) of the liquid crystal display panel attached to the upper surface of the case of the light source apparatus 101, the liquid crystal display panel 52 attached to the frame, an FPC (Flexible Printed Circuits) Board (not shown) electrically connected to the liquid crystal display panel, and the like are attached. Namely, the liquid crystal display panel 52 which is a liquid crystal display element generates the display image by modulating the intensity of transmitted light based on the control signal from the control circuit (not shown) constituting an electronic device together with the LED element 201 which is a solid light source. At this time, since the image light to be generated has a narrow diffusion angle and includes only a specific polarization component, a novel and non-conventional image display apparatus that is close to a surface-emitting laser image source driven by an image signal can be obtained. At present, a laser light flux having the same size as the image obtained by the above-mentioned image display apparatus 48 cannot be obtained by using the laser apparatus also from the viewpoint of technology and safety. Therefore, in this embodiment, for example, the light close to the above-mentioned surface-emitting laser image light is obtained from a light flux from a general light source provided with an LED element.

Subsequently, the configuration of the optical system housed in the case of the light source apparatus 101 will be described in detail below with reference to FIG. 6 together with FIG. 5.

Figure 6:
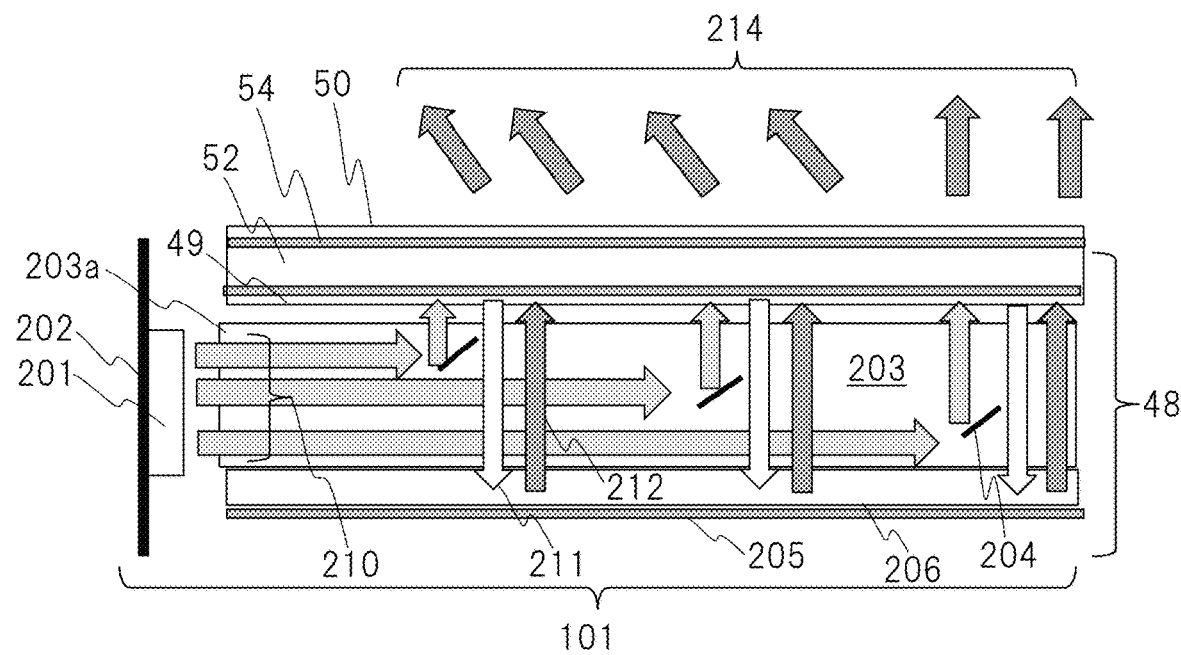
FIG. 6 is a cross-sectional view showing an example of a specific configuration of a light source apparatus.

Since FIG. 5 and FIG. 6 are cross-sectional views, only one of the plurality of LED elements 201 constituting the light source is shown, and these are converted to substantially collimated light by the shape of a light receiving end surface 203a of the light guide body 203. Therefore, the light receiving portion on the end surface of the light guide body and the LED element are attached so as to keep a predetermined positional relationship. Each of the light guide bodies 203 is made of a translucent resin such as acrylic resin. Also, the LED light receiving surface at the end of the light guide body has a conical convex outer peripheral surface obtained by, for example, rotating a paraboloid cross section, has at the top thereof a concave portion in which a convex portion (that is, a convex lens surface) is formed at the center thereof, and has a convex lens surface projecting outward (or a concave lens surface recessed to inside) in the central portion of the flat surface portion thereof (not shown). The outer shape of the light receiving portion of the light guide body to which the LED element 201 is attached has a parabolic shape forming a conical outer peripheral surface, and it is set within an angular range capable of totally reflecting the light emitted in the peripheral direction from the LED element therein or has a reflection surface formed thereon.

On the other hand, the LED element 201 is arranged at a predetermined position on the surface of the LED board 202 which is the circuit board thereof. The LED board 202 is arranged and fixed with respect to the LED collimator (light receiving end surface 203a) such that the LED element 201 on the surface thereof is located at the central portion of the concave portion described above.

With the configuration described above, the light emitted from the LED element 201 can be taken out as substantially parallel light by the shape of the light receiving end surface 203a of the light guide body 203, and the utilization efficiency of the generated light can be improved.

As described above, the light source apparatus 101 is configured by attaching the light source unit, in which a plurality of LED elements 201 as a light source is arranged, on the light receiving end surface 203a serving as a light receiving portion provided on the end surface of the light guide body 203. The divergent light flux from the LED element is converted to substantially parallel light by the lens shape of the light receiving end surface 203a on the end surface of the light guide body, is guided inside the light guide body 203 as indicated by arrows (horizontal direction in the drawing), and is then emitted to the liquid crystal display panel 52 arranged approximately parallel to the light guide body (vertical direction in the drawing) by a light flux direction changing unit 204. By optimizing the distribution (density) of the light flux direction changing unit 204 by the internal shape or the surface shape of the light guide body, the uniformity of the light flux incident on the liquid crystal display panel 52 can be controlled. The above-mentioned light flux direction changing unit 204 emits the light flux, which has propagated in the light guide body by providing a portion having a different refractive index on the surface of the light guide body or inside the light guide body, to the liquid crystal display panel 52 (in the vertical direction in the drawing) arranged substantially parallel to the light guide body. At this time, there is no practical problem if the relative luminance ratio when the luminance of the center of the screen and the luminance of the peripheral portion of the screen are compared in the state where the liquid crystal display panel 52 faces straight the center of the screen and the viewpoint is placed at the same position as the diagonal dimensions of the screen is 20% or more, and the characteristics will be even better if it exceeds 30%.

FIG. 5 is a cross-sectional layout view for describing the configuration and function of the light source of the present embodiment to perform the polarization conversion in the light source apparatus 101 including the light guide body 203 and the LED element 201 described above. In FIG. 5, the light source apparatus 101 includes the light guide body 203 having the light flux direction changing unit 204 provided on its surface made of plastic or the like or in its inside, the LED element 201 as a light source, a reflection sheet 205, a retardation plate 206, a lenticular lens, and the like, and the liquid crystal display panel 52 having polarization plates provided on a light source light incident surface and an image light emission surface is attached on its upper surface.

Further, a film or sheet-shaped transmission type polarization plate 49 is provided on the light source light incident surface (lower surface in the drawing) of the liquid crystal display panel 52 corresponding to the light source apparatus 101, by which one polarized wave (for example, P wave) 212 of the natural light flux 210 emitted from the LED light element 201 is selectively reflected, and the reflected light is reflected by the reflection sheet 205 provided on one surface (lower part of the drawing) of the light guide body 203 and is directed again toward the liquid crystal display panel 52. Then, by providing a retardation plate ($\lambda/4$ plate) between the reflection sheet 205 and the light guide body 203 or between the light guide body 203 and the reflection type polarization plate 49, the light is reflected by the reflection sheet 205 and is transmitted twice to convert the reflection light flux from P-polarized light to S-polarized light, so that the utilization efficiency of the light source light as the image light is improved. Since the image light flux whose light intensity is modulated by the image signal in the liquid crystal display panel 52 (arrows 213 in FIG. 5) is incident on the window glass 220 at a large incident angle as shown in FIG. 1, the reflectance at the transparent sheet 51 is increased, and favorable diffusion characteristics for monitoring inside or outside the store (space) can be obtained.

FIG. 6 is a cross-sectional layout view for describing the configuration and function of the light source of the present embodiment to perform the polarization conversion in the light source apparatus 101 including the light guide body 203 and the LED element 201 similarly to FIG. 5. The light source apparatus 101 also includes the light guide body 203 having the light flux direction changing unit 204 provided on its surface made of plastic or the like or in its inside, the LED element 201 as a light source, the reflection sheet 205, the retardation plate 206, the lenticular lens, and the like, and the liquid crystal display panel 52 having polarization plates provided on a light source light incident surface and an image light emission surface is attached on its upper surface as the image display apparatus 48.

Further, the film or sheet-shaped reflection type polarization plate 49 is provided on the light source light incident surface (lower surface in the drawing) of the liquid crystal display panel 52 corresponding to the light source apparatus 101, by which one polarized wave (for example, S wave) 211 of the natural light flux 210 emitted from the LED light source 201 is selectively reflected, and the reflected light is reflected by the reflection sheet 205 provided on one surface (lower part of the drawing) of the light guide body 203 and is directed again toward the liquid crystal display panel 52. By providing a retardation plate ($\lambda/4$ plate) between the reflection sheet 205 and the light guide body 203 or between the light guide body 203 and the reflection type polarization plate 49, the light is reflected by the reflection sheet 205 and is transmitted twice to convert the reflection light flux from S-polarized light to P-polarized light, so that the utilization efficiency of the light source light as the image light is improved. Even when the image light flux whose light intensity is modulated by the image signal in the liquid crystal display panel 52 (arrows 214 in FIG. 6) is incident on the window glass 220 at a large incident angle as shown in FIG. 1, the reflection on the surface is reduced, and the image light can be efficiently diffused to the outside by the transparent sheet 51.

In the light source apparatus shown in FIG. 5 and FIG. 6, in addition to the function of the polarization plate provided on the light incident surface of the corresponding liquid crystal display panel 52, since the one polarization component is reflected by the reflection type polarization plate, the contrast ratio theoretically obtained is the product of the inverse of the cross transmittance of the reflection type polarization plate and the inverse of the cross transmittance obtained by the two polarization plates attached to the liquid crystal display panel, and thus high contrast performance can be obtained. In fact, it was confirmed by experiments that the contrast performance of the display image was improved by 10 times or more. As a result, a high-quality image comparable to that of the self-luminous organic EL was obtained.

Second Example of Image Display Apparatus

Figure 7:
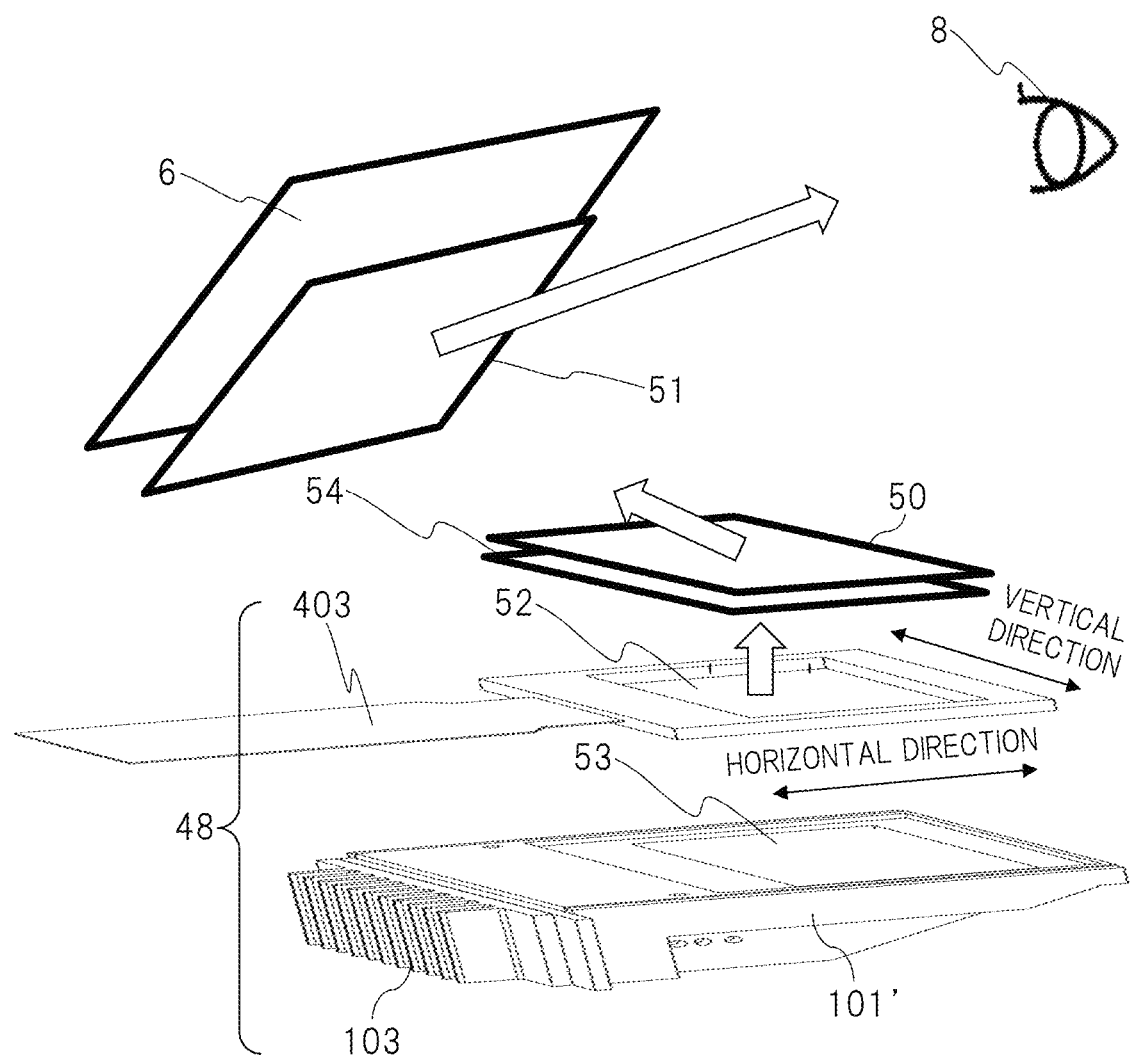
FIG. 7 is a diagram showing an example of a specific configuration of the information display apparatus.

FIG. 7 shows another example of a specific configuration of the image display apparatus 48. The light source apparatus 101' in FIG. 7 corresponds to the light source apparatus 101' in FIG. 8. As shown in the drawing, in the light source apparatus 101, for example, an LED, a collimator, a synthetic diffusion block, and a light guide body are housed in its case made of plastic or the like (see FIG. 7), and the liquid crystal display panel 52 is attached to the upper surface thereof. Further, LED (Light Emitting Diode) elements 14a and 14b which are semiconductor light sources and an LED board 102 on which the control circuit thereof is mounted are attached to one side surface of the case of the light source apparatus 101', and a heat sink 103 which is a member for cooling the heat generated in the LED element and the control circuit is attached to an outer surface of the LED board 102 (see FIG. 7 and FIG. 8).

Further, a liquid crystal display panel frame is attached to the upper surface of the case, and the liquid crystal display panel 52 and an FPC (Flexible Printed Circuits) board 403 (see FIG. 7) electrically connected to the liquid crystal display panel 52 are attached to the frame. Namely, the liquid crystal display panel 52 which is a liquid crystal display element generates the display image by modulating the intensity of the transmitted light based on a control signal from a control circuit (not shown here) constituting an electronic device together with the LED elements 14a and 14b which are solid light sources.

Third Example of Image Display Apparatus

Next, another example of a specific configuration of the image display apparatus 48 will be described with reference to FIG. 11A. Although the detail of the light source apparatus of the image display apparatus 48 will be described later with reference to FIG. 14A and FIG. 14B, the divergent light flux of natural light from the LED (P-polarized wave and S-polarized wave are mixed) is converted into substantially parallel light flux by a collimator lens 18 and is reflected toward the liquid crystal display panel 52 by a reflection type light guide body 304. The reflected light is incident on a wave plate and a reflection type polarization plate 49 arranged between the liquid crystal display panel 52 and the reflection type light guide body 304. After a specific polarized wave (for example, S-polarized wave) is reflected by the reflection type polarization plate and a phase is converted by the wave plate, the light returns to the reflection surface and passes the retardation plate again to be converted into a polarized wave (for example, P-polarized wave) that can transmit the reflection type polarization plate.

As a result, the natural light from the LED is aligned with a specific polarized wave (for example, P-polarized wave), is incident on the liquid crystal display panel 52, and is modulated in luminance in accordance with the image signal, so that the image is displayed on the panel surface. As is the example described above, a plurality of LEDs constituting the light source is shown (however, because of the vertical cross section, only one is shown in FIG. 11A to FIG. 14B), and these are mounted at predetermined positions with respect to the LED collimator 18. The LED collimator 18 is made of a translucent resin such as acrylic resin or glass. Also, the LED collimator 18 has a conical convex outer peripheral surface obtained by rotating a parabolic cross section, and a concave portion having a convex portion (that is, convex lens surface) at its central portion is formed at the top of the LED collimator 18. In addition, a convex lens surface protruding to outside (or a concave lens surface recessed to inside) is formed at a central portion of a flat portion of the LED collimator 18. Note that the parabolic surface forming the conical outer peripheral surface of the LED collimator 18 is set within an angle range capable of totally reflecting the light emitted in the peripheral direction from the LED therein or has a reflection surface formed thereon. The light converted into the substantially parallel light by the LED collimator 18 is reflected by the reflection type light guide body and is incident on the liquid crystal display panel 52 after being aligned with the light of a specific polarized wave by the function of the wave plate (retardation plate) and the reflection type polarization plate. This is the same configuration as that of the light source of the first example of the image display apparatus shown in FIG. 8 and FIG. 9.

Figure 11A:
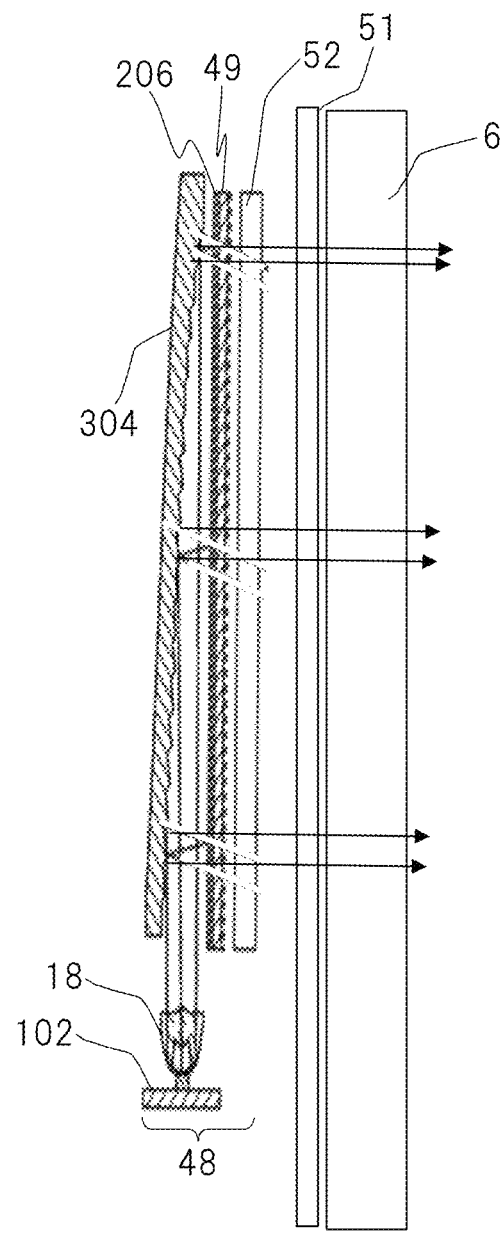
FIG. 11A is a cross-sectional view showing an example of a specific configuration of the information display apparatus.
Figure 11B:
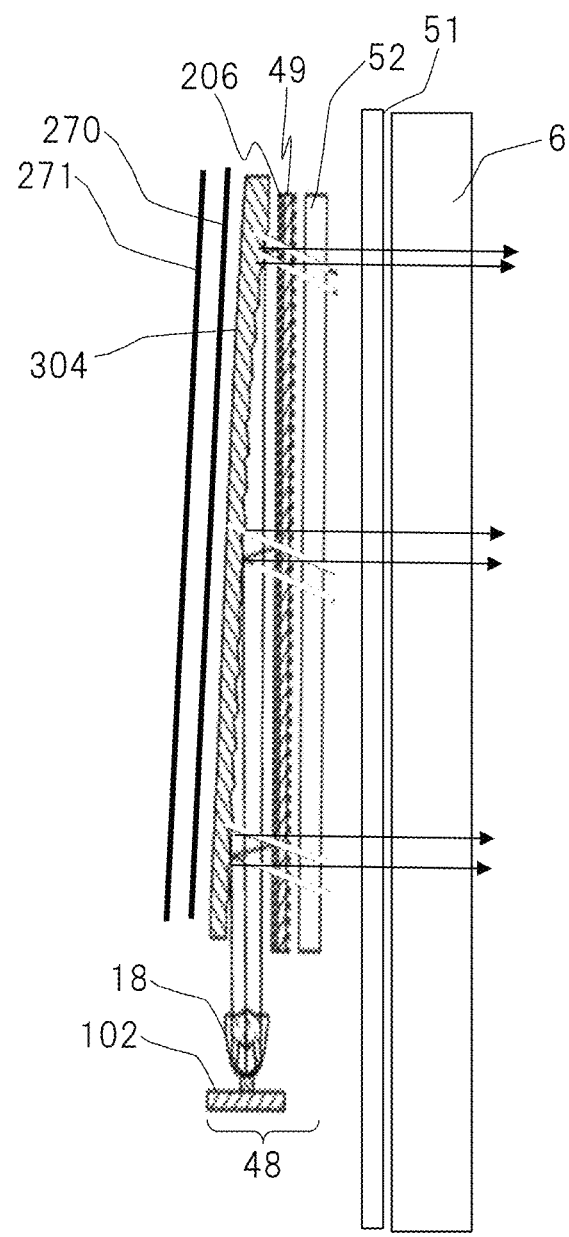
FIG. 11B is a cross-sectional view showing an example of a specific configuration of the information display apparatus.

Alternatively, the configuration shown in FIG. 11B is also applicable. Namely, the light converted into substantially parallel light by the LED collimator 18 is reflected by the reflection type light guide body 304, the light of a specific polarized wave is transmitted by the function of the reflection type polarization plate 49, and the light of the other polarized wave reflected by the reflection type polarization plate 49 passes the reflection type light guide body 304 again and is reflected by a reflection plate 271 provided on the other side of the light guide body that is not in contact with the liquid crystal display panel 52. At this time, the polarization conversion is performed by passing twice a retardation plate ($\lambda/4$ plate) 270 arranged between the reflection plate 271 and the liquid crystal panel 52, and the light is transmitted through the light guide body 304 again, and is then transmitted through the reflection type polarization plate 49 provided on the opposite side, so that the light with aligned polarization direction is incident on the liquid crystal display panel 52. As a result, since all the light from the light source can be used, the light utilization efficiency is doubled.

Figure 20:
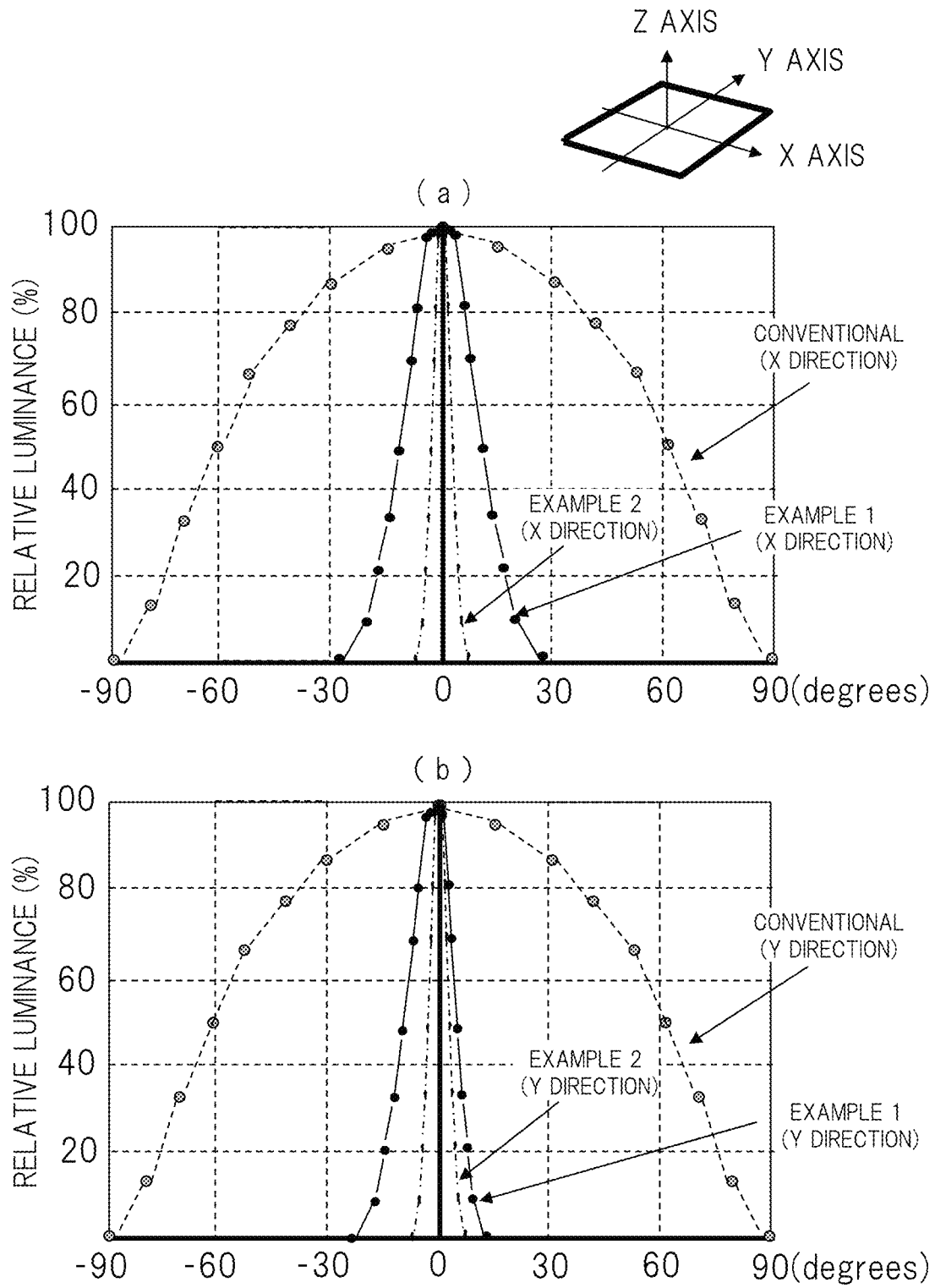
FIG. 20 is a diagram showing image light diffusion characteristics of the image display apparatus.

The light emitted from the liquid crystal display panel has the same diffusion characteristics in both the horizontal direction of the screen (shown by the X axis in FIG. 20(*a*)) and the vertical direction of the screen (shown by the Y axis in FIG. 20(*b*)) in the conventional TV set. On the other hand, in the diffusion characteristics of the light flux emitted from the liquid crystal display panel of the present embodiment, for example, by setting the viewing angle to 13 degrees at which the luminance becomes 50% of the front view (0 degrees) as shown in Example 1 of FIG. 20, the viewing angle becomes ⅕ with respect to the conventional 62 degrees. Similarly, on assumption that the viewing angle in the vertical direction is uneven, the reflection angle and the area of the reflection surface of the reflection type light guide body are optimized such that the viewing angle on an upper side is suppressed to about ⅓ of the viewing angle on a lower side. As a result, the amount of image light in the monitoring direction is significantly improved as compared with the conventional liquid crystal TV, and the luminance becomes 50 times or more.

Further, in the viewing angle characteristics shown in Example 2 of FIG. 20, by setting the viewing angle to 5 degrees at which the luminance becomes 50% of the front view (0 degrees), the viewing angle becomes 1/12 with respect to the conventional 62 degrees. Similarly, on assumption that the viewing angle in the vertical direction is uneven, the reflection angle and the area of the reflection surface of the reflection type light guide body are optimized such that the viewing angle is suppressed to about 1/12 of the conventional case. As a result, the amount of image light in the monitoring direction is significantly improved as compared with the conventional liquid crystal TV, and the luminance becomes 100 times or more. As described above, by setting the viewing angle to be a narrower angle, the amount of light flux toward the monitoring direction can be concentrated, so that the light utilization efficiency is greatly improved. As a result, even if a conventional liquid crystal display panel for TV is used, the luminance can be significantly improved with the same power consumption by controlling the light diffusion characteristics of the light source apparatus, and it is possible to realize the image display apparatus applicable to the information display system for the outdoors. When using a large-sized liquid crystal panel, the overall brightness of the screen can be improved by directing the light in the periphery of the screen inward such that the light is directed toward the observer when the observer faces straight the center of the screen.

As a basic configuration, as shown in FIG. 11A and FIG. 11B, a light flux having narrow angle directional characteristics is incident on the liquid crystal display panel 52 by a light source apparatus and the luminance is modulated in accordance with the image signal, whereby the image information displayed on the screen of the liquid crystal display panel 52 is displayed to the outside of a room or the outside of a vehicle via the glass 6. At this time, a transparent sheet 51 to be described later may be provided on the glass surface in order to control the diffusion characteristics of the image light and reduce the influence of the image quality degradation due to external light.

Fourth Example of Image Display Apparatus

Figure 12A:
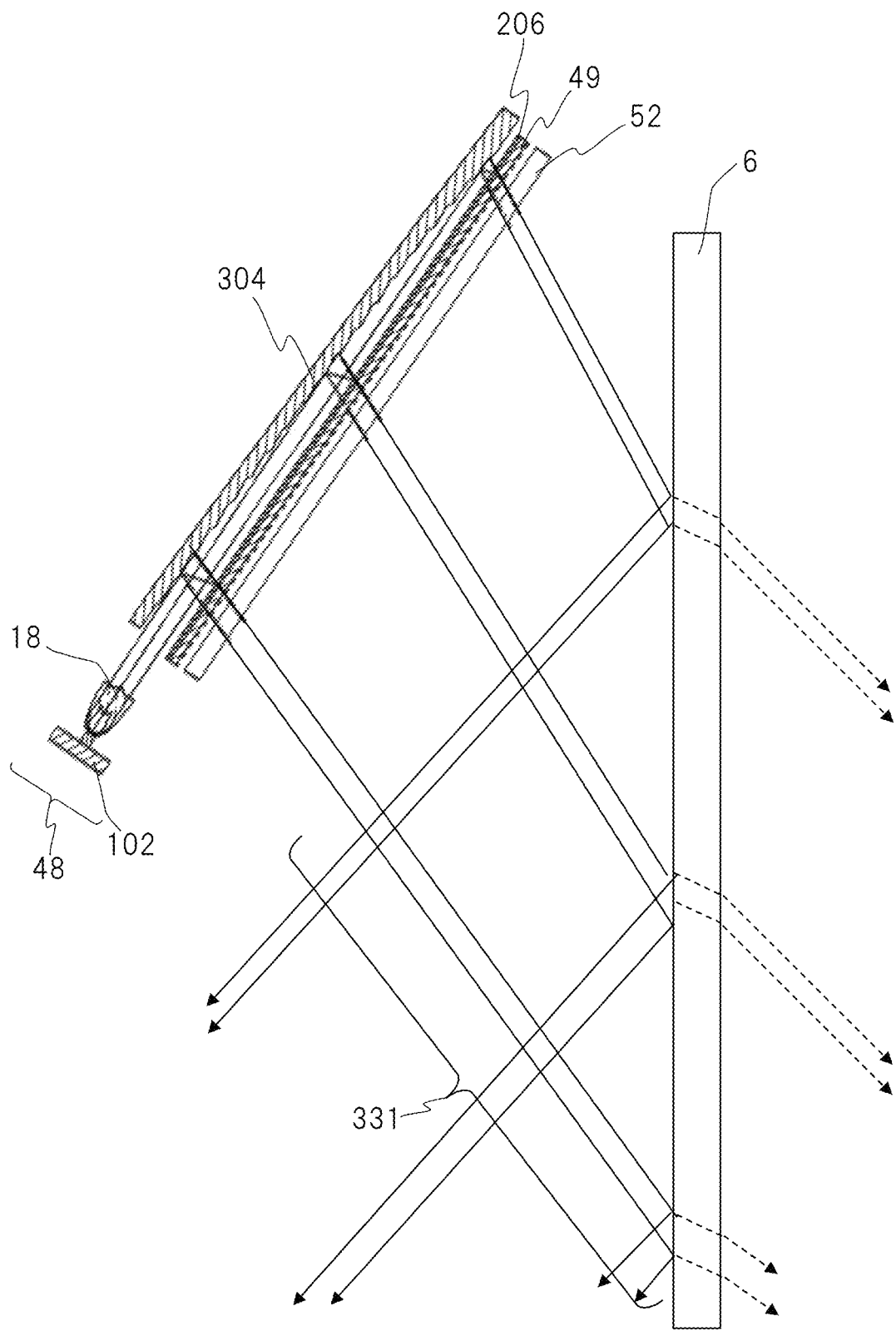
FIG. 12A is a cross-sectional view showing an example of a specific configuration of the information display apparatus.
Figure 12B:
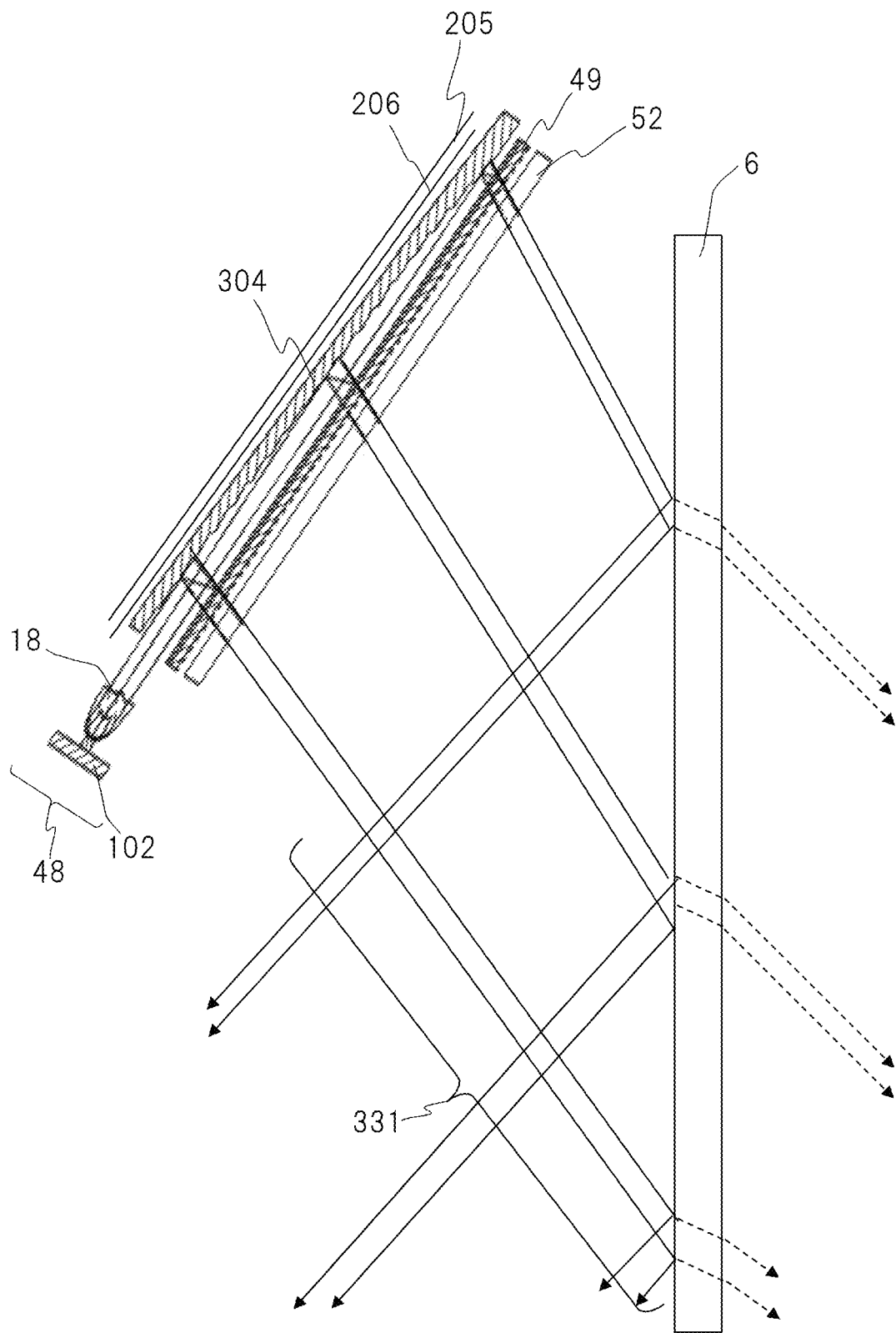
FIG. 12B is a cross-sectional view showing an example of a specific configuration of the information display apparatus.

FIG. 12A and FIG. 12B show another example of a specific configuration of the image display apparatus 48. The difference from FIG. 11A and FIG. 11B is that the liquid crystal display panel 52 which is the image display apparatus is not right in front of the glass 6. Therefore, a part of the image light is reflected on the glass surface, and reflected light 331 can be monitored from the lower left direction of the drawing. By optimally selecting the relative positions of the image display apparatus and the glass 6, the reflected light 331 is reflected in the desired direction, so that the image information can be monitored even inside a room or a vehicle partitioned by the glass 6.

Fifth Example of Image Display Apparatus

Figure 13:
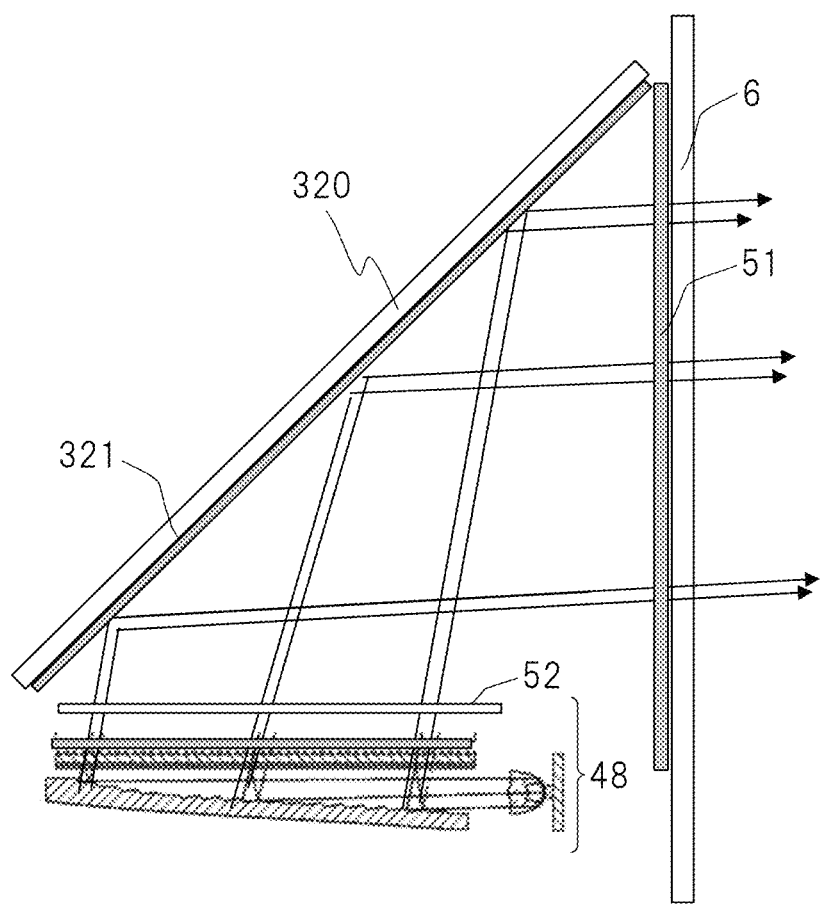
FIG. 13 is a cross-sectional view showing an example of a specific configuration of the information display apparatus.
Figure 17:
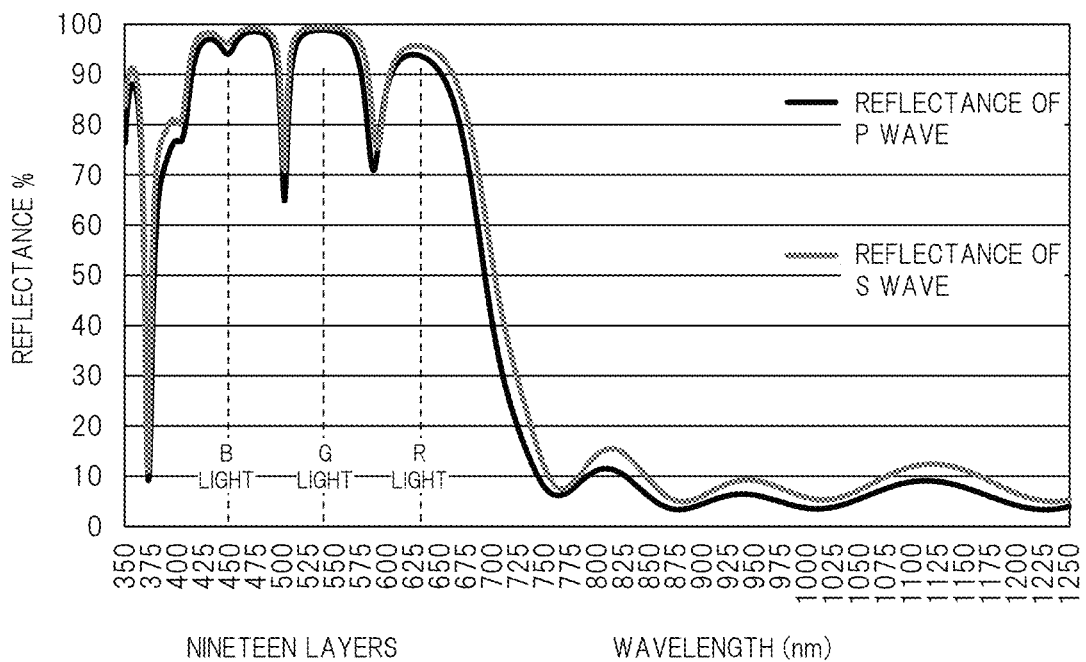
FIG. 17 is a characteristic diagram showing wavelength characteristics of reflectance of a reflection mirror.
Figure 18:
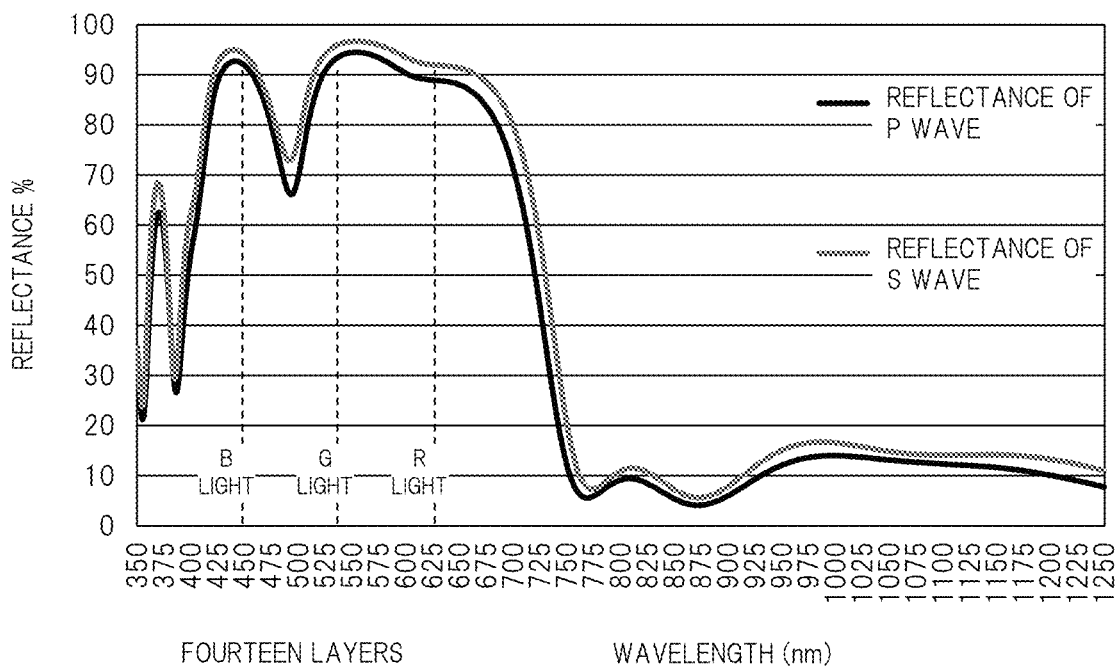
FIG. 18 is a characteristic diagram showing wavelength characteristics of reflectance of a reflection mirror.

FIG. 13 shows another example of a specific configuration of the image display apparatus 48. The difference from FIG. 11A is that the liquid crystal display panel 52 which is the image display apparatus is arranged at the position orthogonal to the glass 6. Therefore, the image light is reflected by a reflection mirror 320 and the image is displayed to outside of a room or a vehicle via the glass surface. It is preferable that a metal multilayer film 321 is provided on the mirror surface such that the reflection characteristics with increased reflectance of a specific wavelength are realized with a small multilayer film configuration, with taking the characteristics of the filter corresponding to the RGB pixels of the liquid crystal display panel 52 into consideration. Furthermore, in order to reduce the influence of sunlight incident on the polarization plate and the liquid crystal panel, the reflectance of light with a wavelength longer than 850 nm (near infrared light) and blue light near 400 nm is suppressed to a low level, so that the damage due to the sunlight on the image display apparatus can be reduced. FIG. 17 shows the characteristics when a metal multilayer film having nineteen layers is formed, and FIG. 18 shows the characteristics when a metal multilayer film having fourteen layers is formed. In order to further increase the reflectance of blue image light, green image light, and red image light required for color image generation, it is necessary to increase the number of films to be formed, but it increases the cost. Therefore, it is necessary to find the optimum number of films by comparing the performance and the cost.

The reflection mirror in the present embodiment is designed such that the same reflectance is obtained for both P-polarized wave and S-polarized wave. The characteristics are shown in FIG. 17 and FIG. 18, and the number of reflection films can be reduced and the film formation cost can be reduced by increasing only the reflectance of a specific polarized wave in accordance with the polarization of the image light from the liquid crystal display panel.

First Example of Light Source Apparatus

Next, the configuration of the optical system housed in the case of the light source apparatus 101' or the like will be described in detail with reference to FIG. 9(a) and FIG. 9(b) in addition to FIG. 8.

Figure 8:
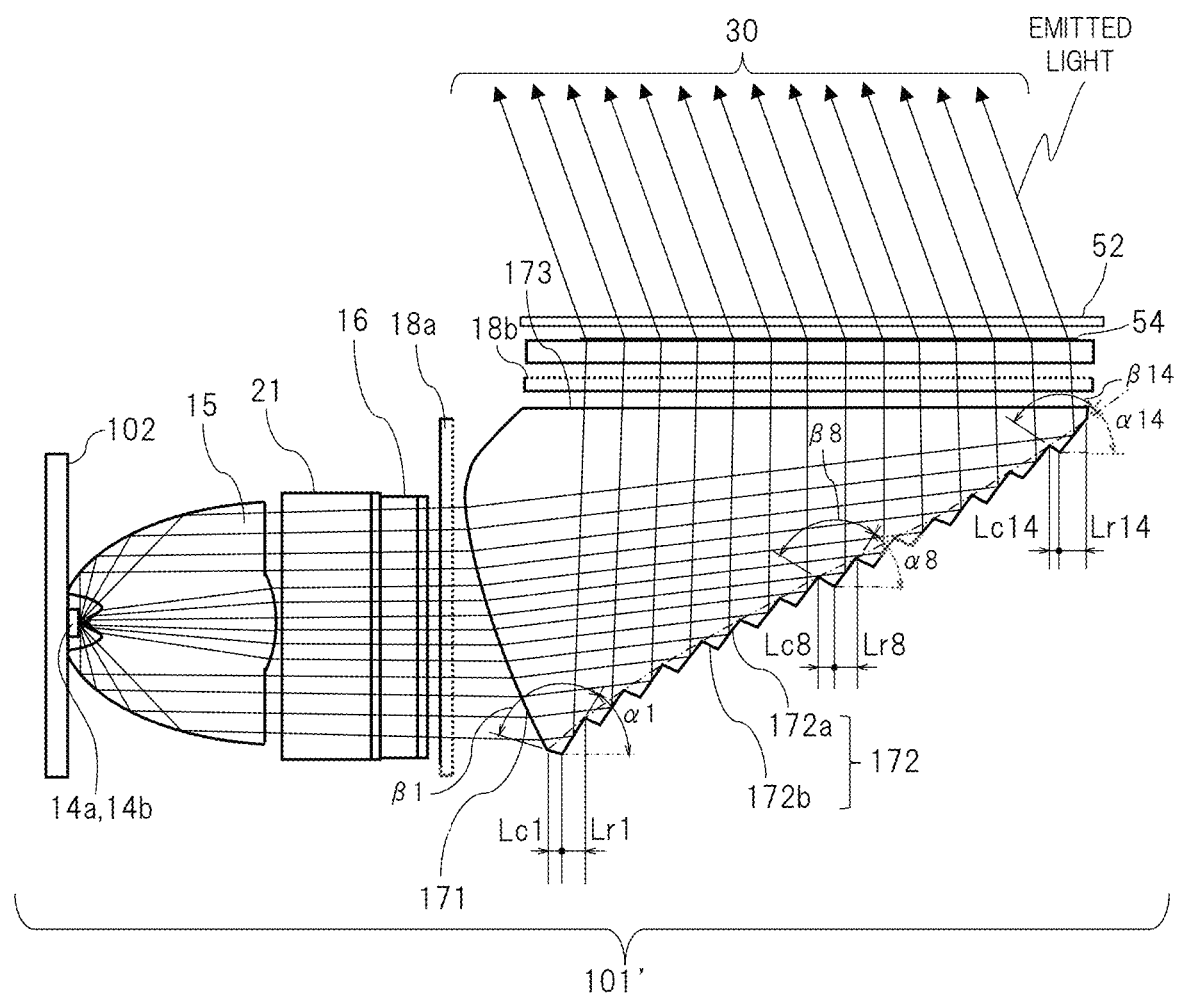
FIG. 8 is a cross-sectional view showing an example of a specific configuration of the light source apparatus.

FIG. 8 and FIG. 9 show LEDs 14a and 14b constituting the light source, and they are attached at predetermined positions with respect to the LED collimator 15. Note that each of the LED collimators 15 is formed of, for example, translucent resin such as acrylic resin. Also, as shown in FIG. 9(b), the LED collimator 15 has a conical convex outer peripheral surface 156 obtained by rotating a parabolic cross section, and a concave portion 153 having a convex portion (that is, convex lens surface) 157 at its central portion is formed at the top of the LED collimator 15. In addition, a convex lens surface 154 protruding to outside (or a concave lens surface recessed to inside) is formed at a central portion of a flat portion of the LED collimator 15. Note that the parabolic surface 156 forming the conical outer peripheral surface of the LED collimator 15 is set within an angle range capable of totally reflecting the light emitted in the peripheral direction from the LEDs 14a and 14b therein or has a reflection surface formed thereon.

Also, the LEDs 14a and 14b are each arranged at predetermined positions on the surface of the LED board 102 which is a circuit board thereof. The LED board 102 is fixed to the LED collimator 15 such that the LED 14a or 14b on the surface of the LED board 12 is arranged at the position of the central portion of the concave portion 153 of the LED collimator 15.

With the configuration described above, the light emitted from the central portion of the LED 14a or 14b in an upward direction (to the right in the drawing) is collected to be parallel light by the two convex lens surfaces 157 and 154 that form the outer shape of the LED collimator 15. Also, the light emitted from the other portion in the peripheral direction is reflected by the parabolic surface that forms the conical outer peripheral surface of the LED collimator 15 and is similarly collected to be parallel light. In other words, with the LED collimator 15 in which the convex lens is formed at the central portion thereof and the parabolic surface is formed in the peripheral portion thereof, almost all of the light generated from the LED 14a or 14b can be taken as the parallel light, and the utilization efficiency of the generated light can be improved.

Note that, on a light emission side of the LED collimator 15, a polarization conversion element 21 is provided. As is clear from FIG. 9, the polarization conversion element 21 is configured by combining a plurality of translucent members having a columnar shape whose cross section is parallelogramic (hereinafter, parallelogram column) and a plurality of translucent members having a columnar shape whose cross section is triangular (hereinafter, triangular column) so as to be arranged in an array in parallel to the surface perpendicular to the light axis of the parallel light from the LED collimator 15. Further, at the interfaces between the adjacent translucent members arranged in an array, a polarizing beam splitter (hereinafter, abbreviated as "PBS") film 211 and a reflection film 212 are alternately provided, and a λ/2 retardation plate 213 is provided on an emission surface from which the light which has been incident on the polarization conversion element 21 and has passed the PBS film 211 is emitted.

A synthetic diffusion block 16 having a rectangular shape shown in FIG. 9(a) is further provided on the emission surface of the polarization conversion element 21. Namely, after the light emitted from the LED 14a or 14b becomes the parallel light by the function of the LED collimator 15 and is incident on the synthetic diffusion block 16, the light is diffused by texture 161 on an emission side and then reaches a light guide body 17.

The light guide body 17 is a member made of translucent resin such as acrylic resin and formed into a rod shape whose cross section is substantially triangular (see FIG. 9(b)), and includes a light guide body incident portion (surface) 171 facing the emission surface of the synthetic diffusion block 16 with a first diffusion plate 18a interposed therebetween, a light guide body reflection portion (surface) 172 forming a sloped surface, and a light guide body emission portion (surface) 173 facing the liquid crystal display panel 52 which is the liquid crystal display element with a second diffusion plate 18b interposed therebetween as can be seen from FIG. 8.

On the light guide body reflection portion (surface) 172 of the light guide body 17, as shown in FIG. 8 which is a partially enlarged view thereof, a large number of reflection surfaces 172a and connection surfaces 172b are alternately formed in a sawtooth shape. Also, the reflection surface 172a (line segment rising to the right in the drawing) forms an (n: natural number of 1 to 130 in this example) with respect to the horizontal plane indicated by a dash-dotted line in the drawing, and the αn is set to, for example, 43 degrees or less (but 0 degrees or more) in this case.

The light guide body incident portion (surface) 171 is formed to have a curved convex shape inclined toward the light source side. Accordingly, the parallel light from the emission surface of the synthetic diffusion block 16 is incident after being diffused through the first diffusion plate 18a, and reaches the light guide body reflection portion (surface) 172 while being slightly bent (deflected) upward by the light guide body incident portion (surface) 171 as can be seen from the drawing. Then, the light is reflected here and reaches the liquid crystal display panel 52 provided on the emission surface on the upper side of the drawing.

With the information display apparatus 48 described above in detail, the light utilization efficiency and the uniform illumination characteristics can be further improved, and at the same time, the apparatus which is reduced in size can be manufactured at low cost with the inclusion of the modularized light source apparatus of the S-polarized light. In the description above, the case in which the polarization conversion element 21 is attached following the LED collimator 15 has been described, but the present invention is not limited to this, and the same function and effect can be obtained by providing the polarization conversion element 21 in the light path to the liquid crystal display panel.

Note that a large number of reflection surfaces 172a and connection surfaces 172b are alternately formed in a sawtooth shape on the light guide body reflection portion (surface) 172, and the illumination light flux is totally reflected upward by each of the reflection surfaces 172a. Further, by providing a narrow-angle diffusion plate on the light guide body emission portion (surface) 173, the substantially parallel diffusion light flux is incident on the light direction changing panel 54 that controls the directional characteristics and is then incident on the liquid crystal display panel 52 from an oblique direction. In this example, the case in which the light direction changing panel 54 is provided between the light guide body emission surface 173 and the liquid crystal panel 52 has been described, but the same effect can be obtained even when the light direction changing panel 54 is provided on the emission surface of the liquid crystal panel 52.

Second Example of Light Source Apparatus

Another example of the configuration of the optical system of the light source apparatus 101' or the like is shown in FIG. 10. As is the example shown in FIG. 9, a plurality of (two in this example) LEDs 14a and 14b constituting the light source is shown, and these are attached at predetermined positions with respect to the LED collimator 15. Note that each of the LED collimators 15 is formed of, for example, translucent resin such as acrylic resin. Also, as is the example shown in FIG. 9, the LED collimator 15 has a conical convex outer peripheral surface 156 obtained by rotating a parabolic cross section, and a concave portion 153 having a convex portion (that is, convex lens surface) 157 at its central portion is formed at the top of the LED collimator 15. In addition, a convex lens surface 154 protruding to outside (or a concave lens surface recessed to inside) is formed at a central portion of a flat portion of the LED collimator 15. Note that the parabolic surface 156 forming the conical outer peripheral surface of the LED collimator 15 is set within an angle range capable of totally reflecting the light emitted in the peripheral direction from the LED 14a therein or has a reflection surface formed thereon.

Also, the LEDs 14a and 14b are each arranged at predetermined positions on the surface of the LED board 102 which is a circuit board thereof. The LED board 102 is fixed to the LED collimator 15 such that the LED 14a or 14b on the surface of the LED board 12 is arranged at the position of the central portion of the concave portion 153 of the LED collimator 15.

With the configuration described above, the light emitted from the central portion of the LED 14a or 14b in an upward direction (to the right in the drawing) is collected to be parallel light by the two convex lens surfaces 157 and 154 that form the outer shape of the LED collimator 15. Also, the light emitted from the other portion in the peripheral direction is reflected by the parabolic surface that forms the conical outer peripheral surface of the LED collimator 15 and is similarly collected to be parallel light. In other words, with the LED collimator 15 in which the convex lens is formed at the central portion thereof and the parabolic surface is formed in the peripheral portion thereof, almost all of the light generated from the LED 14a or 14b can be taken as the parallel light, and the utilization efficiency of the generated light can be improved.

Note that a light guide body 170 is provided on the light emission side of the LED collimator 15 via the first diffusion plate 18a. The light guide body 170 is a member made of translucent resin such as acrylic resin and formed into a rod shape whose cross section is substantially triangular (see FIG. 10(a)), and includes a light incident portion 171 of the light guide body 170 facing the emission surface of the diffusion block 16 with the first diffusion plate 18a interposed therebetween, a light guide body reflection portion (surface) 172 forming a sloped surface, and a light guide body emission portion (surface) 173 facing the liquid crystal display panel 52 which is the liquid crystal display element with a reflection type polarization plate 200 interposed therebetween as can be seen from FIG. 10(a).

For example, if the reflection type polarization plate 200 having a property of reflecting P-polarized light (transmitting S-polarized light) is selected, the reflection type polarization plate 200 reflects the P-polarized light of the natural light emitted from the LED serving as a light source, and the reflected P-polarized light passes a λ/4 plate 202 provided on the light guide body reflection portion 172 shown in FIG. 10(b), is reflected by a reflection surface 201, and passes the λ/4 plate 202 again, so that the P-polarized light is converted into the S-polarized light and all of the light flux incident on the liquid crystal display panel 52 uniformly becomes the S-polarized light.

Similarly, if the reflection type polarization plate 200 having a property of reflecting S-polarized light (transmitting P-polarized light) is selected, the reflection type polarization plate 200 reflects the S-polarized light of the natural light emitted from the LED serving as a light source, and the reflected S-polarized light passes the λ/4 plate 202 provided on the light guide body reflection portion 172 shown in FIG. 10(b), is reflected by the reflection surface 201, and passes the λ/4 plate 202 again, so that the S-polarized light is converted into the P-polarized light and all of the light flux incident on the liquid crystal display panel 52 uniformly becomes the P-polarized light. The polarization conversion can be similarly realized with the above-described configuration.

Third Example of Light Source Apparatus

Figure 14A:
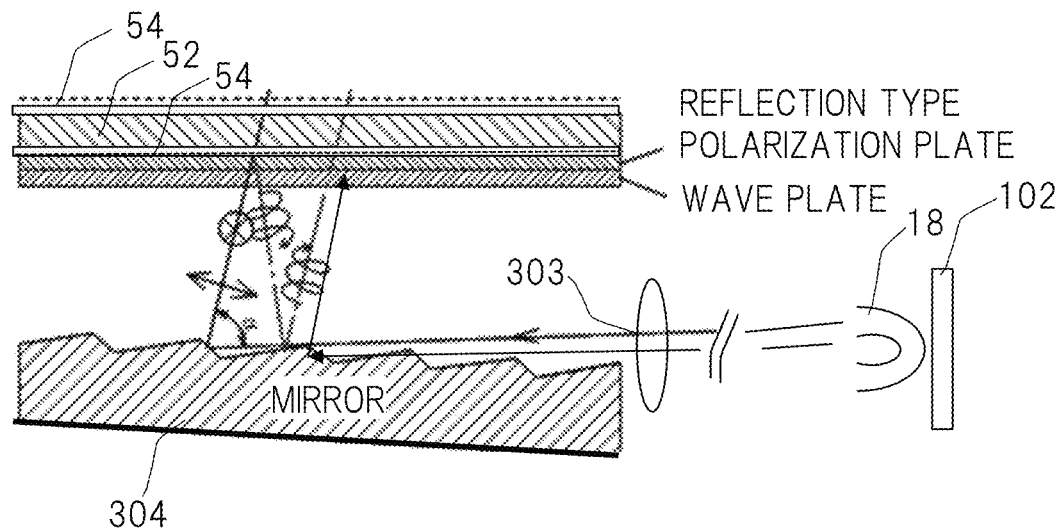
FIG. 14A is a diagram showing an example of a specific configuration of the light source apparatus.

Another example of the light source apparatus is shown in FIG. 14A. Also, the arrangement of the light source apparatus and the liquid crystal display panel 52 of this example is shown in FIG. 11A to FIG. 13. The light source apparatus converts the divergent light flux of natural light (P-polarized light and S-polarized light are mixed) from the LED into substantially parallel light flux by the collimator lens 18 and reflects it toward the liquid crystal display panel 52 by the reflection type light guide body 304.

The reflected light is incident on a wave plate and a reflection type polarization plate arranged between the liquid crystal display panel 52 and the reflection type light guide body 304. After a specific polarized wave (for example, S-polarized wave) is reflected by the reflection type polarization plate and a phase is converted by a wave plate (not shown) provided on a surface which connects reflection surfaces of the reflection type light guide body, the light returns to the reflection surface and passes the retardation plate again to be converted into a polarized wave (for example, P-polarized wave) that can transmit the reflection type polarization plate.

Figure 14B:
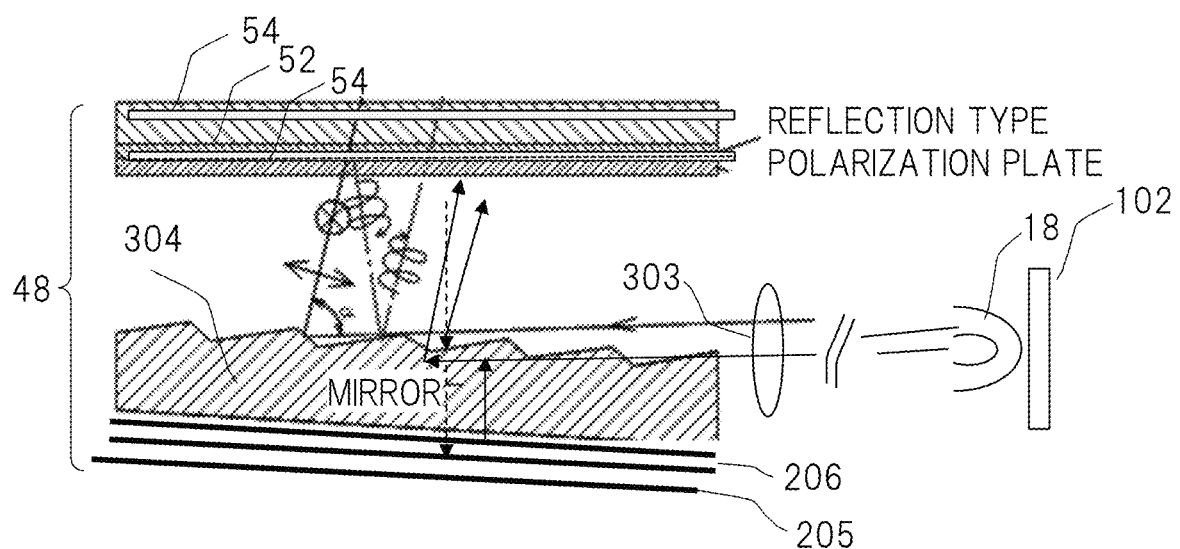
FIG. 14B is a diagram showing an example of a specific configuration of the light source apparatus.

Alternatively, as shown in FIG. 14B, the reflected light is incident on the reflection type polarization plate arranged between the liquid crystal display panel 52 and the reflection type light guide body 304. After a specific polarized wave (for example, S-polarized wave) is reflected by the reflection type polarization plate and passes a surface which connects reflection surfaces of the light guide body 304, it is reflected by the reflection plate 205 arranged on an opposite side of the light guide body 304 and is subjected to polarization conversion by passing the retardation plate (λ/4 wave plate) 206 twice, and then it is incident on the liquid crystal display panel 52 through the light guide body and the reflection type polarization plate to be modulated into image light. At this time, since the light utilization efficiency is doubled as compared with usual by matching the specific polarized wave and the polarization plane subjected to the polarization conversion and the polarization degree (extinction ratio) of the reflection type polarization plate can also be added to the extinction ratio of the entire system, the contrast ratio of the information display system is significantly improved by using the light source apparatus of this example.

As a result, the natural light from the LED is aligned with a specific polarized wave (for example, P-polarized wave). As is the example described above, a plurality of LEDs constituting the light source is shown (however, because of the vertical cross section, only one is shown in FIG. 11A to FIG. 14B), and these are mounted at predetermined positions with respect to the LED collimator 18. The LED collimator 18 is made of a translucent resin such as acrylic resin or glass. Also, the LED collimator 18 has a conical convex outer peripheral surface obtained by rotating a parabolic cross section, and a concave portion having a convex portion (that is, convex lens surface) at its central portion is formed at the top of the LED collimator 18. In addition, a convex lens surface protruding to outside (or a concave lens surface recessed to inside) is formed at a central portion of a flat portion of the LED collimator 18. Note that the parabolic surface forming the conical outer peripheral surface of the LED collimator 18 is set within an angle range capable of totally reflecting the light emitted in the peripheral direction from the LED therein or has a reflection surface formed thereon.

Also, the LEDs are each arranged at predetermined positions on the surface of the LED board 102 which is a circuit board thereof. The LED board 102 is fixed to the LED collimator 18 such that the LED on the surface of the LED board is arranged at the position of the central portion of the concave portion of the LED collimator.

With the configuration described above, the light emitted from the central portion of the LED is collected to be parallel light by the two convex lens surfaces that form the outer shape of the LED collimator 18. Also, the light emitted from the other portion in the peripheral direction is reflected by the parabolic surface that forms the conical outer peripheral surface of the LED collimator 18 and is similarly collected to be parallel light. In other words, with the LED collimator 18 in which the convex lens is formed at the central portion thereof and the parabolic surface is formed in the peripheral portion thereof, almost all of the light generated from the LED can be taken as the parallel light, and the utilization efficiency of the generated light can be improved.

Note that an optical element 303 that converts the diffusion characteristics in the vertical direction and the horizontal direction (not shown in the front-back direction of the drawing) in the cross-sectional views shown in FIG. 14A and FIG. 14B may be provided on the light emission side of the LED collimator 18. In order to efficiently irradiate the reflection surface of the light guide body with light, it is preferable that the diffusion angle in the vertical direction of the screen is matched with the width of the vertical surface of the reflection surface of the light guide body and the diffusion angle in the horizontal direction is optimally designed by using the number of LEDs and the divergence angle from the optical element 303 as design parameters such that the surface density of the light flux emitted from the liquid crystal display panel 52 becomes uniform. Namely, the horizontal diffusion angle and the vertical diffusion angle may be different from each other.

If the reflection type polarization plate having a property of reflecting S-polarized light (transmitting P-polarized light) is selected, the reflection type polarization plate reflects the S-polarized light of the natural light emitted from the LED serving as a light source, and the reflected S-polarized light passes the retardation plate arranged between the reflection type polarization plate and the reflection type light guide body shown in FIG. 14A and the like and is then reflected by the reflection surface. Thereafter, the light passes the retardation plate again to be converted into P-polarized light and is then incident on the liquid crystal display panel 54. The optimum value of the thickness of the retardation plate needs to be selected depending on the incident angle of the light beam onto the retardation plate, and the optimum value is present in the range from λ/16 to λ/4. At this time, the uniformity of the brightness can be improved by making the design such that the incident angle onto the liquid crystal display panel becomes constant over the entire screen region by using also the reflection angle of the reflection type light guide body as a design parameter.

<Lenticular Lens>

In order to control the diffusion distribution of the image light from the liquid crystal display panel 52, the unidirectional emission characteristics can be controlled by optimizing the lens shape by providing the lenticular lens between the light source apparatus 101 and the liquid crystal display panel 52 or on the surface of the liquid crystal panel 52. Further, by arranging the microlens array in a matrix shape, the emission characteristics of the image light flux from the image display apparatus 48 can be controlled in the x-axis direction and the y-axis direction, and as a result, an image display apparatus having desired diffusion characteristics can be obtained.

The function of the lenticular lens will be described. The lenticular lens makes it possible to efficiently reflect or diffuse the light emitted from the image display apparatus 48 described above on the transparent sheet 51 on the window glass 220 by optimizing the lens shape. Namely, for example, by arranging two lenticular lenses in combination or microlens array in a matrix shape with respect to the image light from the image display apparatus 48 and providing a sheet for controlling diffusion characteristics, the luminance (relative luminance) of the image light can be controlled in accordance with its reflection angle (0 degrees in the vertical direction) in the X-axis direction and the Y-axis direction. In the present embodiment, by the lenticular lens mentioned above, the luminance characteristics in the vertical direction are made steeper as shown in FIG. 20(b) and further the light luminance (relative luminance) by the reflection and diffusion is increased by changing the balance of the directional characteristics in the vertical direction (positive and negative directions of the Y-axis) as compared with the conventional case, whereby the image light having a narrow diffusion angle (high straightness) and including only a specific polarization component like the image light from the surface-emitting laser image source is obtained, and is efficiently delivered to the eyes of the observer.

Also, by achieving the directional characteristics having significantly narrower angle in both the X-axis direction and the Y-axis direction by the above-mentioned light source apparatus, as compared with the diffusion characteristics of the emission light from the general liquid crystal panel (referred to as conventional in the drawing) shown in FIG. 20(a) and FIG. 20(b), the image display apparatus configured to emit the light of a specific polarization which emits an image light flux almost parallel to a specific direction can be realized.

FIG. 19 shows an example of the characteristics of the lenticular lens used in the present embodiment. In this example, in particular, the characteristics in the X direction (vertical direction) are shown, and a characteristic O shows a luminance characteristic in which the peak in the light emission direction is at an angle of about 30 degrees upward from the vertical direction (0 degrees) and is vertically symmetrical. Also, characteristics A and B in FIG. 19 further show examples of the characteristics in which the image light above the peak luminance is condensed at about 30 degrees to increase the luminance (relative luminance). Therefore, in these characteristics A and B, the luminance (relative luminance) of light is sharply reduced at the angle exceeding 30 degrees as compared with the characteristic O.

Namely, with the optical system including the above-mentioned lenticular lens, the image light from the image display apparatus 48 can be reflected or diffused while increasing (emphasizing) the luminance thereof in a specific direction via the transparent sheet 51 on the window glass 220 described below. Consequently, the image light from the image display apparatus 48 can be efficiently delivered to the eyes of the observer inside or outside the room as the light having a narrow diffusion angle (high straightness) and including only a specific polarization component like the image light from the surface-emitting laser image source. According to this, even if the intensity (luminance) of the image light from the image display apparatus 48 is reduced, the observer can accurately recognize the image light and obtain information. In other words, it is possible to realize the information display system with lower power consumption by further reducing the output of the image display apparatus 48.

In a general TFT (Thin Film Transistor) liquid crystal panel, luminance and contrast performances differ depending on the light emission direction in accordance with the mutual characteristics of the liquid crystal and the polarization plate. The characteristics at the angle slightly deviated (+5 degrees in the present embodiment) from the emission angle vertical to the panel surface (emission angle: 0 degrees) are excellent. This is because the characteristics of twisting light in the up-down direction of the liquid crystal do not become 0 degrees when the applied voltage is maximum.

On the other hand, the contrast performance in the up-down direction is excellent in the range of −15 degrees to +15 degrees, and the use in the range of ±10 degrees centered on 5 degrees can obtain the best characteristics when combined with the luminance characteristics.

Also, the characteristics of the luminance and the viewing angle in the left-right direction of the panel are excellent at the emission angle vertical to the panel surface (emission angle: 0 degrees). This is because the characteristics of twisting light in the left-right direction of the liquid crystal become 0 degrees when the applied voltage is maximum.

Similarly, the contrast performance in the left-right direction is excellent in the range of −5 degrees to −10 degrees, and the use in the range of ±5 degrees centered on −5 degrees can obtain the best characteristics when combined with the luminance characteristics. Therefore, by making the light enter the liquid crystal display panel from the direction in which the most excellent characteristics can be obtained by the light flux direction changing unit 204 provided in the light guide body 203 of the light source apparatus 101 and performing the light modulation by the image signal, the image quality and performance of the image display apparatus 48 can be improved.

In order to bend the image light from the liquid crystal display panel as the image display element in a desired direction, it is preferable to provide the light direction changing panel 54 using a lenticular lens sheet or the like on the emission surface of the liquid crystal display panel.

Unidirectional Transparent Sheet: First Example of Transmission Type

FIG. 15 shows a configuration of a transparent sheet 51' that diffuses the image light flux to the outside of the vehicle or the outside of the room. The polarization plate 57 that transmits P waves and the retardation plate 58 are provided on the image light flux incident surface of the transparent diffusion sheet material 55, and the image light flux reflected by the transparent diffusion sheet material 55 is prevented from returning to the inside of the room (space in which the information display apparatus is installed). As a result, the image projected on the window glass 220' does not hinder the observer. As the optimum phase difference of the retardation plate 58 provided between the polarization plate 57 and the transparent diffusion sheet material 55, an optimal value is preferably selected in accordance with the diffusion characteristics of the transparent diffusion sheet. When the diffusion angle is large, it is preferably close to λ/4, and when the diffusion angle is small, better conversion performance can be obtained by combining with a λ/8 plate or the like.

Also, it was confirmed that, by providing a sheet to which the reflection enhanced coating whose reflectance of a specific polarization was increased was applied instead of the above-mentioned transparent diffusion sheet material 55 as a substitute of the polarization plate or applying the reflection enhanced coating to the surface of the polarization plate, the reflectance of the image light flux could be increased and simultaneously the intensity of the double image generated by the reflected image of the window glass 220' could be significantly reduced, that is, it was confirmed that the same effect as the above-mentioned technique could be obtained.

Further, it is preferable that, by using, for example, PDLC (Polymer Dispersed Liquid Crystal) of Santech Display Co., Ltd. instead of the transparent diffusion sheet material 55 described above, the image light is diffused without applying a voltage in the image display state and it is used instead of the transparent sheet by turning it to a transparent state by applying a voltage in the image non-display state. Also, the inventors revealed by experiment that it was possible to realize a screen having a novel function capable of controlling the diffusion characteristics by changing the voltage applied to the PDLC and capable of controlling the transmittance in accordance with the image by modulating the applied voltage in synchronization with the ON/OFF or the intensity of the image signal.

The image information display system having a desired monitoring range can be realized by diffusing the image light flux having a narrow angle from the image display apparatus in the vertical and horizontal directions.

Unidirectional Transparent Sheet: Second Example of Transmission Type

FIG. 16 shows a configuration in which the image light control film 70 is used as the external light control film (hereinafter, denoted by a reference numeral 70) in addition to the transparent sheet 51' that diffuses the image light flux to the outside of the vehicle or the outside of the room. The S-polarized wave of sunlight incident on the window glass 220 from an oblique direction is reflected, and the P-polarized wave thereof is transmitted and directed to the transparent sheet 51'. At this time, the sunlight is absorbed by the black portion 70a provided in the external light control film 70, and does not reach the inside of the room or the vehicle in which the image display apparatus is arranged. In addition, since it is not mixed with the image light from the image display apparatus 48, deterioration of the image quality is also prevented. The transparent sheet 51' is made of the transparent diffusion sheet material 55. For this transparent sheet 51', a film obtained by melting and stretching a thermoplastic polymer in which zirconium nanoparticles and diamond nanoparticles having a large refractive index are dispersed, for example, "KALEIDO SCREEN" manufactured by JXTG Energy Co., Ltd. can be used. Consequently, the display which is transparent and does not prevent the observer from monitoring the scenery of the outside world (outside the store) when the image is not displayed and the display which diffuses and reflects the image light such that the observer outside the store (space) can visually recognize the image information when the image is displayed, that is, the unidirectional display can be realized.

Further, since the image light incident on the window glass 220 from an oblique direction is hardly blocked by the black portion 70a and passes the transparent portion 70b, it is diffused by the transparent sheet 51' and the image display to the outside world (to the outside of the vehicle or outside of the store) is possible. As the external light control film 70, for example, a viewing angle control film (VCF: View Control Film) of Shin-Etsu Polymer Co., Ltd. is suitable, and since the structure thereof is such that transparent silicon and black silicon are alternately arranged and a synthetic resin is arranged on a light incident surface and a light emission surface to form a sandwich structure, the same effect as that of the external light control film of the present embodiment can be expected. It is desirable that a pitch h of the transparent portion 70b and the black portion 70a of the viewing angle control film is ⅓ or less with respect to the pixels of the image to be displayed. At this time, when the viewing angle α is desired to be larger than 90 degrees, a thickness W should be set such that h/w becomes larger than 1.0, and when the viewing angle α is desired to be smaller than 90 degrees, the thickness W should be set such that h/w becomes smaller than 1.0. Also, the energy loss can be reduced by matching an inclination angle γ of the black portion with the incident angle of the image light determined by the mounting positions of the image display apparatus 48 and the window glass.

On the other hand, there is no practical problem if the haze (HAZE) defined by the ratio of the diffusion transmittance and the parallel light transmittance of the transparent sheet 51' is 10% or less, but it is preferably 4% or less. Also, by providing a sheet to which the reflection enhanced coating whose reflectance of a specific polarization is increased is applied instead of the above-mentioned transparent diffusion sheet material 55, the reflectance of the image light flux can be increased and simultaneously the intensity of the double image generated by the reflected image of the window glass 220 can be significantly reduced. Namely, it was confirmed that the same effect as the above-mentioned technique could be obtained.

Further, it is preferable that, by using, for example, PDLC of Santech Display Co., Ltd. instead of the transparent diffusion sheet material 55 described above, the image light is diffused without applying a voltage in the image display state and it is used instead of the transparent sheet by turning it to a transparent state by applying a voltage in the image non-display state. Also, the inventors revealed by experiment that it was possible to realize a screen having a novel function capable of controlling the diffusion characteristics by changing the voltage applied to the PDLC and capable of controlling the transmittance in accordance with the image by modulating the applied voltage in synchronization with the ON/OFF or the intensity of the image signal.

According to the embodiment described above in detail, since the image light from the image display apparatus 48 can be made to have a narrow diffusion angle (high straightness) and include only a specific polarization component like the image light from the surface-emitting laser image source. Therefore, various information can be displayed to the outside of the space by using, for example, the show window 220 that constitutes the space, and the utilization efficiency of the show window can be greatly improved.

Also, it is possible to realize the information display system capable of displaying high-quality images with high resolution and capable of significantly reducing power consumption by improving the utilization efficiency of the light emitted from the light source. Further, when displaying a larger image, a large-sized liquid crystal display panel 52 obtained by combining a plurality of relatively inexpensive liquid crystal display panels by making the joints thereof continuous may be adopted as the liquid crystal display panel 52 that is an image display element constituting the image display apparatus 48 together with the light source apparatus 101. In this case, also by directing the light flux from the light source apparatus 101 to the transparent sheet 51 parallelly provided on the window glass 220 and unidirectionally reflecting/diffusing it by the transparent sheet 51, more expanded image information can be displayed while significantly reducing the power consumption.

In the above description, an example in which the information display system is applied to a store which is a space partitioned by a show window which is a transparent member such as glass and information is unidirectionally displayed to the inside or outside thereof by using the show window 220 has been described, but the present invention is not limited to this example. Namely, the information display system according to the present invention can unidirectionally display the information to the inside or outside of the specific space by using the transparent member that partitions the space as long as the space is partitioned by using a transparent member such as glass, and other examples of the information display system will be described below.

<Vehicle Information Display System>

According to the embodiment described above, (1) the image light generated from the image display apparatus 48 and emitted toward the show window 220 which is a member to which the light is projected as shown in FIG. 1 is converted to image light having a narrow diffusion angle (high straightness) and including only a specific polarization component like the image light from the surface-emitting laser image source, so that high-quality images can be displayed with high resolution and power consumption can be significantly reduced by improving the utilization efficiency of the emitted light, and (2) the overall outer shape of the apparatus can be formed to be flat (panel-like) shape as is apparent from the component parts described above. Therefore, various examples of the so-called vehicle information display system in which the information display system of the present invention is applied by utilizing these features to a vehicle such as an automobile, a train, and an aircraft instead of a space such as a store will be described in detail below.

Figure 2:
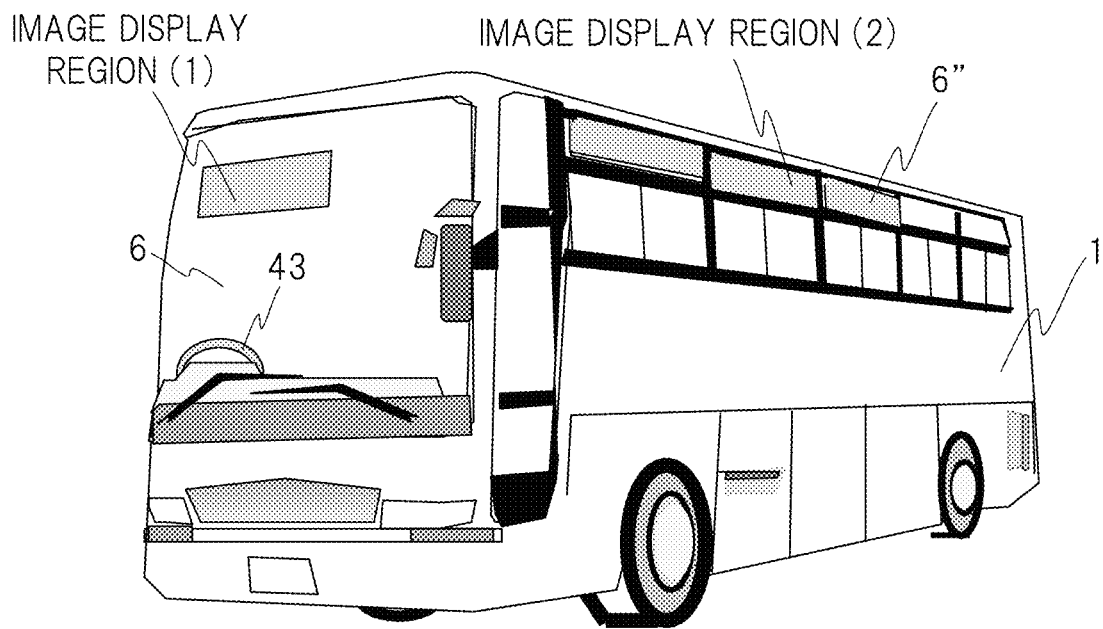
FIG. 2 is a diagram showing an example in which the information display system is applied to a bus as a vehicle.
Figure 3:
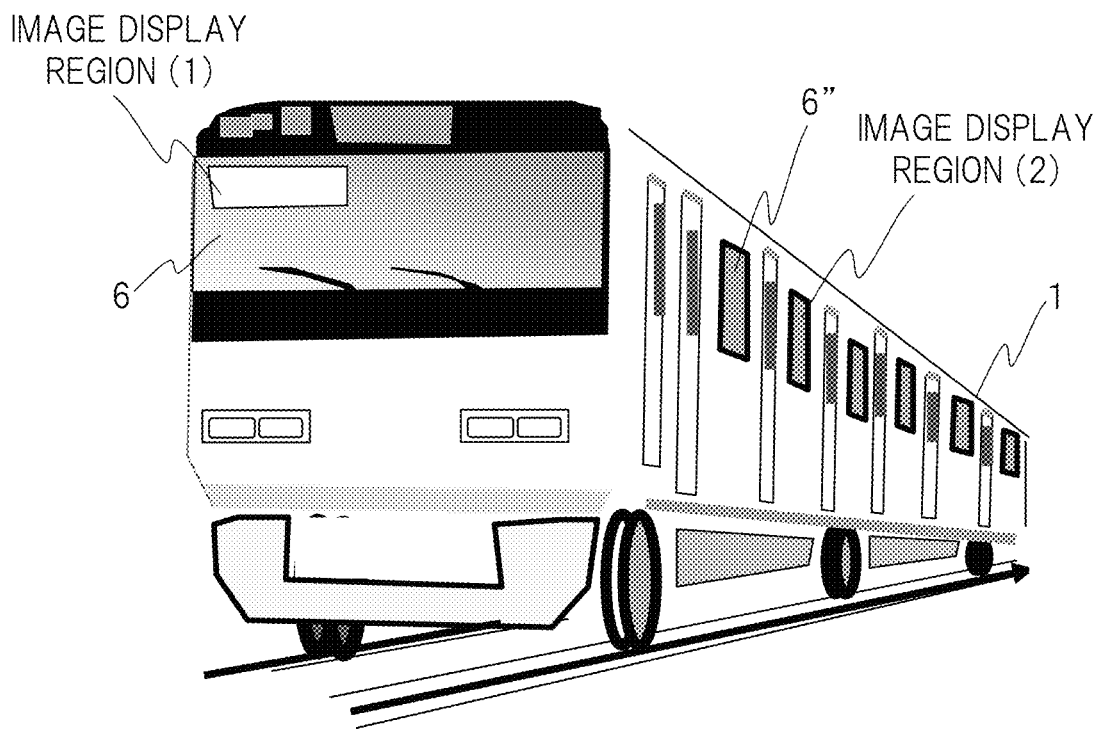
FIG. 3 is a diagram showing an example in which the information display system is applied to a train as a vehicle.

FIG. 2 and FIG. 3 each show examples in which the image display apparatus 48 and the like described above are mounted on a commercial vehicle, and image information is displayed on a part of the windshield 6 (upper part of a steering 43), a part of a side glass 6" (gray part), or all of them. FIG. 2 and FIG. 3 each show an example of an image display region.

As a specific configuration for displaying an image via (a part or all of) the window glass of an automobile, for example, the image display apparatus 48 including the large-sized liquid crystal display panel 52 shown in FIG. 11A, FIG. 11B, and the like is installed along the window glass of a vehicle body 1. A plurality of reflection type light guide bodies 304 constituting the light source apparatus is provided on the back surface of the liquid crystal display panel 52 as the light source apparatus, so that the image light having a narrow diffusion angle (high straightness) and an aligned polarization plane like the light from the surface-emitting laser light source is obtained. These light fluxes, the light intensity of which is modulated in accordance with the image signal by the liquid crystal display panel 52, are displayed to the outside of the vehicle via the windshield 6, the rear glass 6' (not shown), or the side glass 6". As the liquid crystal display panel 52, the conventional panel for TV can be used, and a large-sized liquid crystal panel and a high-resolution 8$k$ panel can also be used.

Alternatively, in the use for the commercial vehicle shown in FIG. 2, a windshield or a rear glass has a curved surface in some cases, and thus the image may be distorted due to the refraction of the glass when the image is monitored from the outside of the vehicle via the glass. Therefore, it is preferable that the original image is distorted to have a corrected shape such that the image after passing the glass becomes a proper image and a suitable image can be monitored from the image-monitoring side.

Figure 21:
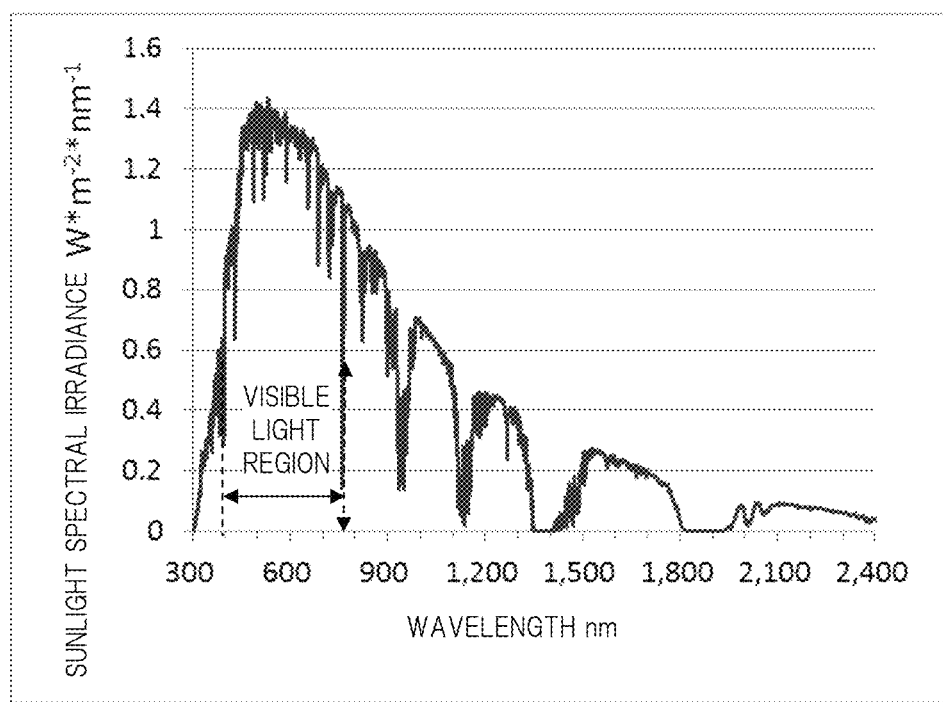
FIG. 21 is a diagram showing a wavelength distribution of natural light such as sunlight.
Figure 22:
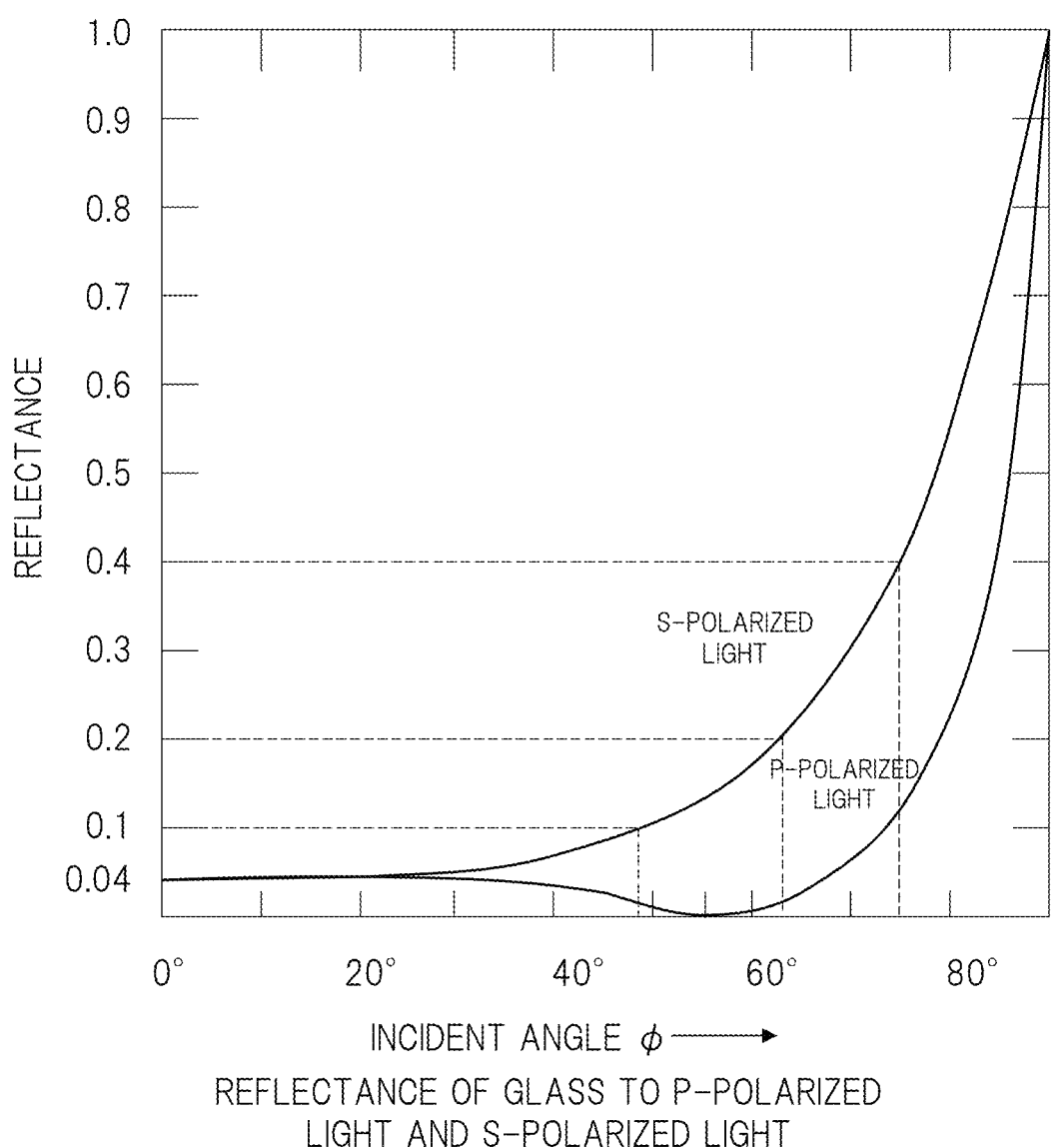
FIG. 22 is a diagram showing reflectance of glass with respect to P-polarized light and S-polarized light of natural light such as sunlight.

Further, in the vehicle information display system, since the vehicle itself is exposed to natural light including sunlight, it is necessary to take some measures for sunlight. However, as shown in FIG. 21, natural light such as sunlight is not only the light of the wide wavelength range from the ultraviolet to the infrared but also exists in the state where the lights of two types of polarization directions such as the light in the vibration direction perpendicular to the traveling direction of the light and the light in the horizontal direction (hereinafter, referred to as S-polarized light and P-polarized light) are mixed. In particular, in the region in which the incident angle on the windshield 6 is larger than 50 degrees, as shown in FIG. 22, the reflectance on the glass surface varies depending on the S-polarized light, the P-polarized light, and the incident angle, respectively.

Therefore, in the present embodiment, based on the above-mentioned findings by the inventors, that is, considering that most of the sunlight entering through the windshield 6 was a P-polarized light component, it was confirmed that it was particularly effective to reduce the P wave component in order to suppress external light including sunlight irradiated to and entering the information display apparatus. In addition, it was confirmed that it was effective to use the S wave component as the image light to be emitted from the information display apparatus to the outside of the vehicle and monitored by the observers.

In the foregoing, the various embodiments have been described above. However, the present invention is not limited to the above-described embodiments, and includes various modifications. For example, the above embodiments have described the entire system in detail in order to make the present invention easily understood, and the present invention is not necessarily limited to those having all the described configurations. Also, a part of the configuration of one embodiment may be replaced with the configuration of another embodiment, and the configuration of one embodiment may be added to the configuration of another embodiment. Furthermore, another configuration may be added to a part of the configuration of each embodiment, and a part of the configuration of each embodiment may be eliminated or replaced with another configuration.

The preferable modes in the foregoing embodiment will be additionally presented below.

[Additional Remark 1]

A light source apparatus configured to supply light in a specific polarization direction to an image display apparatus, comprising:

a point or surface light source;
an optical unit configured to reduce a divergence angle of light from the light source; and
a light guide body having a reflection surface configured to reflect the light from the light source to propagate it to the image display apparatus,
wherein the reflection surface of the light guide body is arranged so as to face the image display apparatus, and a reflection type polarization plate and a retardation plate are arranged in order from a side closer to the image display apparatus between the image display apparatus and the reflection surface,
wherein the light in the specific polarization direction reflected by the reflection type polarization plate is caused to pass the retardation plate, is reflected by the reflection surface of the light guide body, and is caused to pass the retardation plate to convert the polarization direction, thereby propagating the light in the specific polarization direction to the image display apparatus, and
wherein a part or all of a divergence angle of a light flux incident on the image display apparatus from the light source is controlled by a shape and roughness of a reflection surface provided on the light source apparatus.

[Additional Remark 2]
The light source apparatus according to additional remark 1,
wherein the divergence angle is within ±30 degrees.

[Additional Remark 3]
The light source apparatus according to additional remark 1,
wherein the divergence angle is within ±10 degrees.

[Additional Remark 4]
The light source apparatus according to additional remark 1,
wherein a horizontal diffusion angle and a vertical diffusion angle are different from each other.

[Additional Remark 5]
The light source apparatus according to additional remark 1,
wherein the image display apparatus is a liquid crystal panel element, and contrast performance obtained by multiplying an inverse of a cross transmittance of the reflection type polarization plate with a contrast obtained by characteristics of polarization plates provided on a light incident surface and an emission surface can be obtained.

[Additional Remark 6]
An information display system including a light source apparatus configured to supply light in a specific polarization direction to an image display apparatus,
wherein the light source apparatus includes:
a point or surface light source;
an optical unit configured to reduce a divergence angle of light from the light source; and
a light guide body having a reflection surface configured to reflect the light from the light source to propagate it to the image display apparatus,
wherein the reflection surface of the light guide body is arranged so as to face the image display apparatus, and a reflection type polarization plate and a retardation plate are arranged in order from a side closer to the image display apparatus between the image display apparatus and the reflection surface,
wherein the light in the specific polarization direction reflected by the reflection type polarization plate is caused to pass the retardation plate, is reflected by the reflection surface of the light guide body, and is caused to pass the retardation plate to convert the polarization direction, thereby propagating the light in the specific polarization direction to the image display apparatus, and
wherein a part or all of a divergence angle of a light flux incident on the image display apparatus from the light source is controlled by a shape and roughness of a reflection surface provided on the light source apparatus.

[Additional Remark 7]
The information display system according to additional remark 6,
wherein a plurality of the light sources is provided for one image display element.

[Additional Remark 8]
The information display system according to additional remark 6,
wherein a plurality of surface-emitting light sources having different light emission directions is provided for one image display element.

[Additional Remark 9]
A light source apparatus configured to supply light in a specific polarization direction to an image display apparatus, comprising:
a point or surface light source;
a first optical unit configured to reduce a divergence angle of light from the light source; and
a second optical unit configured to diffuse a light flux emitted from the first optical unit in a horizontal direction of a screen of the image display apparatus,
wherein the light from the light source is incident on a light guide body arranged adjacent to a light emission surface of the second optical unit, is reflected by a reflection surface provided on the light guide body, and is propagated to the image display apparatus arranged at a position facing the reflection surface,
wherein a connection surface which connects the reflection surfaces of the light guide body is arranged so as to face the image display apparatus and a reflection type polarization plate is arranged between the image display apparatus and the reflection surface,
wherein a polarization conversion unit having the reflection surface is arranged via a retardation plate on the other surface facing the reflection surface and the connection surface, the polarization direction of the light in the specific polarization direction reflected by the reflection type polarization plate is converted, and the light in the specific polarization direction is propagated to the image display apparatus, and
wherein a part or all of a divergence angle of a light flux incident on the image display apparatus from the light source is controlled by a shape and roughness of the reflection surface provided on the light source apparatus.

[Additional Remark 10]
The light source apparatus according to additional remark 9,
wherein the divergence angle is within ±30 degrees.

[Additional Remark 11]
The light source apparatus according to additional remark 9,
wherein the divergence angle is within ±10 degrees.

[Additional Remark 12]

The light source apparatus according to additional remark 9, wherein a horizontal diffusion angle and a vertical diffusion angle are different from each other.

[Additional Remark 13]

The light source apparatus according to additional remark 9, wherein the image display apparatus is a liquid crystal panel element, and contrast performance obtained by multiplying an inverse of a cross transmittance of the reflection type polarization plate with a contrast obtained by characteristics of polarization plates provided on a light incident surface and an emission surface can be obtained.

[Additional Remark 14]

An information display system including a light source apparatus configured to supply light in a specific polarization direction to an image display apparatus, wherein the light source apparatus includes:
    a point or surface light source;
    a first optical unit configured to reduce a divergence angle of light from the light source; and
    a second optical unit configured to diffuse a light flux emitted from the first optical unit in a horizontal direction of a screen of the image display apparatus,
wherein the light from the light source is incident on a light guide body arranged adjacent to a light emission surface of the second optical unit, is reflected by a reflection surface provided on the light guide body, and is propagated to the image display apparatus arranged at a position facing the reflection surface,
wherein a connection surface which connects the reflection surfaces of the light guide body is arranged so as to face the image display apparatus and a reflection type polarization plate is arranged between the image display apparatus and the reflection surface,
wherein a polarization conversion unit having the reflection surface is arranged via a retardation plate on the other surface facing the reflection surface and the connection surface, the polarization direction of the light in the specific polarization direction reflected by the reflection type polarization plate is converted, and the light in the specific polarization direction is propagated to the image display apparatus, and
wherein a part or all of a divergence angle of a light flux incident on the image display apparatus from the light source is controlled by a shape and roughness of the reflection surface provided on the light source apparatus.

[Additional Remark 15]

The information display system according to additional remark 14,
    wherein a plurality of the light sources is provided for one image display element.

[Additional Remark 16]

The information display system according to additional remark 14,
    wherein a plurality of surface-emitting light sources having different light emission directions is provided for one image display element.

[Additional Remark 17]

A light source apparatus configured to supply light in a specific polarization direction to an image display apparatus, comprising:
    a point or surface light source;
    a first optical unit configured to reduce a divergence angle of light from the light source;
    a first polarization conversion unit configured to align light from the first optical unit in a specific polarization direction;
    a second optical unit configured to diffuse light emitted from the first polarization conversion unit in a horizontal direction of a screen of the image display apparatus; and
    a light guide body having a reflection surface configured to reflect the light from the light source to propagate it to the image display apparatus,
wherein the light from the light source is incident on the light guide body arranged adjacent to a light emission surface of the second optical unit, the light guide body has a surface facing the image display apparatus, the reflection surface of the light guide body reflects a light flux from the light source toward the image display apparatus arranged so as to face the light guide body, and light aligned with a specific polarized wave is propagated to the image display apparatus, and
wherein illuminance modulation is performed in accordance with an image signal, and at this time, a part or all of a divergence angle of the light incident on the image display apparatus from the light source is controlled by a shape and roughness of the reflection surface.

[Additional Remark 18]

A light source apparatus comprising:
a point or surface light source; and
a first optical unit configured to reduce a divergence angle of light from the light source,
wherein light from the first optical unit is incident on a light guide body arranged adjacent to a light emission surface,
wherein the light guide body is arranged so as to face an image display apparatus and has a reflection surface therein or on a surface thereof, and the reflection surface of the light guide body reflects a light flux from the light source toward the image display apparatus arranged so as to face the light guide body,
the light source apparatus further comprising a second polarization conversion unit in which a reflection type polarization plate is arranged between the image display apparatus and the light guide body, light in a specific polarization direction reflected by the reflection type polarization plate is caused to pass a part connecting reflection surfaces of the light guide body, is reflected on a reflection surface provided in parallel to a wave plate on an opposite side of the light guide body closer to the image display apparatus, and is caused to pass the wave plate twice, thereby converting the polarization direction of the light in the specific polarization direction,
wherein the light whose polarization direction has been converted is propagated to the image display apparatus, and
wherein a part of a divergence angle of the light incident on the image display apparatus from the light source is controlled by a shape and roughness of the reflection surface.

[Additional Remark 19]

A light source apparatus in which the first polarization conversion unit and the second polarization conversion unit of the light source apparatus according to additional remark 17 or 18 are used together to further improve a polarization degree,
    wherein a part or all of a divergence angle of a light flux incident on the image display apparatus from the light source is controlled by a shape and roughness of the reflection surface provided on the light source apparatus in the same manner as the light source apparatus according to additional remark 17 or 18, thereby realizing further improvement in light utilization efficiency.

REFERENCE SIGNS LIST

1 . . . automobile (vehicle) body, 6 . . . windshield, 6" . . . side glass, 48 . . . image display apparatus, 49 . . . reflection type polarization plate, 52 . . . liquid crystal display panel (element), 50 . . . protective cover, 51 . . . unidirectional transparent sheet, 54 . . . light direction changing panel, 55 . . . transparent diffusion sheet material, 57 . . . polarization plate, 58 . . . retardation plate, 70a . . . black portion, 70b . . . transparent portion, 202 . . . LED board, 203 . . . light guide body, 205 . . . reflection sheet, 206 . . . retardation plate, 220 . . . show window

The invention claimed is:

1. An information display system including a light source apparatus configured to supply light in a specific polarization direction to an imaue display apparatus, an image display apparatus configured to modulate an intensity of light in a specific polarization direction in accordance with an image signal, and an image display surface,
wherein the light source apparatus includes:
a point or surface light source;
an optical element configured to reduce a divergence angle of light from the light source;
a light guide body configured to propagate the light from the light source to the image display apparatus; and
a reflection type polarization plate arranged between the light guide body and the image display apparatus,
wherein the light guide body is provided with a reflection surface configured to reflect the light from the light source toward the reflection type polarization plate,
wherein light in a specific polarization direction reflected by the reflection type polarization plate is reflected by a reflection plate and is caused to pass a retardation plate twice, thereby performing polarization conversion, and the light in the specific polarization direction is propagated to the image display apparatus by passing the reflection type polarization plate,
wherein a part or all of a divergence angle of a light flux incident on the image display apparatus from the light source is adjusted by a shape and roughness of a reflection surface provided on the light source apparatus,
wherein image light of a specific polarization based on an image displayed on the image display apparatus is specularly reflected on a surface of the image display surface, thereby displaying a reflected image, and
wherein a unidirectional transparent diffusion sheet is provided on a surface of the image display surface, and a polarization plate transmitting a P wave and a retardation plate are provided on an image light flux incident surface of the transparent diffusion sheet, thereby preventing an image light flux reflected by the transparent diffusion sheet from returning to a space in which the image display apparatus is provided.

2. The information display system according to claim 1, wherein the reflection plate is provided on a surface connecting the reflection surface and the reflection surface of the light guide body, and the retardation plate is arranged between the light guide body and the reflection type polarization plate.

3. The information display system according to claim 1, wherein the reflection plate is arranged adjacent to the light guide body so as to face the light guide body, and the retardation plate is arranged between the light guide body and the reflection plate.

4. The information display system according to claim 1, wherein a plurality of the light sources is provided for one image display element.

5. The information display system according to claim 1, wherein a plurality of surface-emitting light sources having different light emission directions is provided for one image display element.

6. The information display system according to claim 1, wherein the divergence angle is within ±30 degrees.

7. The information display system according to claim 1, wherein the divergence angle is within ±10 degrees.

8. The information display system according to claim 1, wherein a horizontal diffusion angle and a vertical diffusion angle are different from each other.

9. An information display system including a light source apparatus configured to supply light in a specific polarization direction to an image display apparatus, an image display apparatus configured to modulate an intensity of light in a specific polarization direction in accordance with an image signal, and an image display surface,
wherein the light source apparatus includes:
a point or surface light source;
an optical element configured to reduce a divergence angle of light from the light source;
a light guide body configured to propagate the light from the light source to the image display apparatus; and
a reflection type polarization plate arranged between the light guide body and the image display apparatus,
wherein the light guide body is provided with a reflection surface configured to reflect the light from the light source toward the reflection type polarization plate,
wherein light in a specific polarization direction reflected by the reflection type polarization plate is reflected by a reflection plate and is caused to pass a retardation plate twice, thereby performing polarization conversion, and the light in the specific polarization direction is propagated to the image display apparatus by passing the reflection type polarization plate,
wherein a part or all of a divergence angle of a light flux incident on the image display apparatus from the light source is adjusted by a shape and roughness of a reflection surface provided on the light source apparatus,
wherein image light of a specific polarization based on an image displayed on the image display apparatus is specularly reflected on a surface of the image display surface, thereby displaying a reflected image, and
wherein a unidirectional transparent diffusion sheet is provided on a surface of the image display surface, and a reflection enhanced layer whose reflectance to a polarization of the image light is increased is applied to an image light flux incident surface of the transparent diffusion sheet or the reflection enhanced layer is provided on a surface of the polarization plate, thereby preventing an image light flux reflected by the transparent diffusion sheet from returning to a space in which the image display apparatus is provided.

10. The information display system according to claim 9, wherein the reflection plate is provided on a surface connecting the reflection surface and the reflection surface of the light guide body, and the retardation plate is arranged between the light guide body and the reflection type polarization plate.

11. The information display system according to claim 9, wherein the reflection plate is arranged adjacent to the light guide body so as to face the light guide body, and the retardation plate is arranged between the light guide body and the reflection plate.

12. The information display system according to claim 9, wherein a plurality of the light sources is provided for one image display element.

13. The information display system according to claim 9, wherein a plurality of surface-emitting light sources having different light emission directions is provided for one image display element.

14. The information display system according to claim 9, wherein the divergence angle is within ±30 degrees.

15. The information display system according to claim 9, wherein the divergence angle is within ±10 degrees.

16. The information display system according to claim 9, wherein a horizontal diffusion angle and a vertical diffusion angle are different from each other.

17. An information display system including a light source apparatus configured to supply light in a specific polarization direction to an image display apparatus, an image display apparatus configured to modulate an intensity of light in a specific polarization direction in accordance with an image signal, and an image display surface,
    wherein the light source apparatus includes:
        a point or surface light source,
        an optical element configured to reduce a divergence angle of light from the light source;
        a light guide body configured to propagate the light from the light source to the image display apparatus; and
        a reflection type polarization plate arranged between the light guide body and the image display apparatus,
    wherein the light guide body is provided with a reflection surface configured to reflect the light from the light source toward the reflection type polarization plate,
    wherein light in a specific polarization direction reflected by the reflection type polarization plate is reflected by a reflection plate and is caused to pass a retardation plate twice, thereby performing polarization conversion, and the light in the specific polarization direction is propagated to the image display apparatus by passing the reflection type polarization plate,
    wherein a part or all of a divergence angle of a light flux incident on the image display apparatus from the light source is adjusted by a shape and roughness of a reflection surface provided on the light source apparatus,
    wherein image light of a specific polarization based on an image displayed on the image display apparatus is specularly reflected on a surface of the image display surface, thereby displaying a reflected image, and
    wherein a unidirectional transparent diffusion sheet is provided on a surface of the image display surface, and a PDLC (Polymer Dispersed Liquid Crystal) which diffuses image light without applying a voltage in an image display state and is in a transparent state by applying a voltage in an image non-display state is provided on the transparent diffusion sheet, thereby providing a function capable of controlling diffusion characteristics by changing the voltage to be applied and capable of controlling transmittance in accordance with the image by modulating the applied voltage in synchronization with ON/OFF or an intensity of the image signal.

18. The information display system according to claim 17, wherein a plurality of the light sources is provided for one image display element.

19. The information display system according to claim 17, wherein a plurality of surface-emitting light sources having different light emission directions is provided for one image display element.

20. The information display system according to claim 17, wherein the divergence angle is within ±30 degrees.

21. The information display system according to claim 17, wherein the divergence angle is within ±10 degrees.

22. The information display system according to claim 17, wherein a horizontal diffusion angle and a vertical diffusion angle are different from each other.

23. The information display system according to claim 17, wherein the reflection plate is provided on a surface connecting the reflection surface and the reflection surface of the light guide body, and the retardation plate is arranged between the light guide body and the reflection type polarization plate.

24. The information display system according to claim 17, wherein the reflection plate is arranged adjacent to the light guide body so as to face the light guide body, and the retardation plate is arranged between the light guide body and the reflection plate.

\* \* \* \* \*